US012773985B2

(12) United States Patent
Wi

(10) Patent No.: US 12,773,985 B2
(45) Date of Patent: Oct. 27, 2026

(54) METHOD AND APPARATUS FOR CONTROLLING VEHICLE

(71) Applicants: Hyundai Motor Company, Seoul (KR); Kia Corporation, Seoul (KR)

(72) Inventor: Hyoung Jong Wi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 17 days.

(21) Appl. No.: 18/965,858

(22) Filed: Dec. 2, 2024

(65) Prior Publication Data

US 2025/0326390 A1 Oct. 23, 2025

(30) Foreign Application Priority Data

Apr. 17, 2024 (KR) ........................ 10-2024-0051397

(51) Int. Cl.
*B60W 30/09* (2012.01)
*B60W 10/18* (2012.01)

(52) U.S. Cl.
CPC ............ *B60W 30/09* (2013.01); *B60W 10/18* (2013.01); *B60W 2554/4041* (2020.02); *B60W 2710/18* (2013.01); *B60W 2720/10* (2013.01)

(58) Field of Classification Search
CPC ...... B60W 10/18; B60W 30/08; B60W 30/09; B60W 30/0953; B60W 30/0956; B60W 30/18109; B60W 40/02; B60W 40/105; B60W 50/14; B60W 2420/403; B60W 2420/408; B60W 2520/10; B60W 2554/4041; B60W 2554/80; B60W 2554/801; B60W 2710/18; B60W 2720/10
USPC ........................................................... 701/93
See application file for complete search history.

(56) References Cited

U.S. PATENT DOCUMENTS

| | | | | |
|---|---|---|---|---|
| 11,840,143 | B2 * | 12/2023 | Hirakuri | B60W 30/146 |
| 12,017,661 | B2 * | 6/2024 | Kim | B60L 15/2009 |
| 2017/0369054 | A1 * | 12/2017 | Nishimura | B60W 30/09 |
| 2018/0257660 | A1 * | 9/2018 | Ibrahim | G01S 5/0027 |
| 2022/0118970 | A1 * | 4/2022 | Takaki | B60W 50/14 |
| 2022/0161787 | A1 * | 5/2022 | Kinoshita | B60W 10/18 |
| 2022/0234615 | A1 * | 7/2022 | Nishino | G01S 17/931 |
| 2022/0324467 | A1 * | 10/2022 | Alvarez | B60W 40/10 |

(Continued)

FOREIGN PATENT DOCUMENTS

| | | | | |
|---|---|---|---|---|
| EP | 4002323 | A1 * | 5/2022 | B60W 50/14 |
| EP | 4098501 | A1 * | 12/2022 | B60W 30/09 |

(Continued)

*Primary Examiner* — Atul Trivedi
(74) *Attorney, Agent, or Firm* — Banner & Witcoff, Ltd.

(57) ABSTRACT

A method and apparatus for controlling vehicle. An aspect of the present disclosure provides a vehicle control method performed by an apparatus of a vehicle. The vehicle control method may include: identifying a target approaching in a lateral direction of the vehicle; determining, based on a current position of the target, a primary lateral control time; determining, based on the primary lateral control time, a collision overlap; determining, based on the collision overlap, a secondary lateral control time; and adjusting, based on the secondary lateral control time, a traveling speed of the vehicle. The collision overlap may indicate what proportion of a lateral width of the vehicle is projected to overlap with a longitudinal width of the target.

20 Claims, 39 Drawing Sheets

(56) References Cited

U.S. PATENT DOCUMENTS

| | | | | |
|---|---|---|---|---|
| 2023/0115708 | A1* | 4/2023 | Xiang | B60W 60/001 701/23 |
| 2023/0234575 | A1* | 7/2023 | Iwase | B60W 30/09 |
| 2023/0294678 | A1* | 9/2023 | Oka | B60W 30/09 701/26 |
| 2023/0391321 | A1* | 12/2023 | Oguro | B60W 30/09 |
| 2023/0406301 | A1* | 12/2023 | Parks | B60W 30/12 |
| 2023/0408642 | A1* | 12/2023 | Monteuuis | G01S 13/931 |
| 2024/0051573 | A1* | 2/2024 | Clawson | B60W 30/0956 |
| 2024/0067174 | A1* | 2/2024 | Adam | B60W 30/143 |
| 2024/0092376 | A1* | 3/2024 | Tamura | B60W 30/16 |
| 2024/0092390 | A1* | 3/2024 | Philion | G06N 3/006 |
| 2024/0103513 | A1* | 3/2024 | Gordon | G05D 1/0038 |
| 2024/0109539 | A1* | 4/2024 | Lee | B60W 30/18163 |
| 2024/0132054 | A1* | 4/2024 | Weston | B60W 30/02 |
| 2024/0208469 | A1* | 6/2024 | Ando | B60T 7/12 |
| 2024/0239317 | A1* | 7/2024 | Kwon | B60R 21/0134 |
| 2024/0262348 | A1* | 8/2024 | Wi | B60W 10/18 |
| 2024/0409125 | A1* | 12/2024 | Taylor | B60W 60/0011 |
| 2025/0002042 | A1* | 1/2025 | Di Cairano | B60W 60/0011 |
| 2025/0083650 | A1* | 3/2025 | Ando | B60T 7/22 |
| 2025/0083654 | A1* | 3/2025 | Ando | B60T 8/172 |
| 2025/0091571 | A1* | 3/2025 | Kuehnle | B60W 30/12 |
| 2025/0121883 | A1* | 4/2025 | Ravella | B60W 30/02 |
| 2025/0128687 | A1* | 4/2025 | Morita | B60T 8/171 |
| 2025/0162612 | A1* | 5/2025 | Woelki | B60W 60/00274 |
| 2025/0304076 | A1* | 10/2025 | Shimizu | B60W 40/06 |
| 2025/0353501 | A1* | 11/2025 | Chae | B60W 30/18163 |

FOREIGN PATENT DOCUMENTS

| | | | | |
|---|---|---|---|---|
| EP | 4292899 | A1 * | 12/2023 | B60W 60/0011 |
| EP | 4370388 | B1 * | 8/2025 | B60T 8/171 |
| FR | 3120040 | A1 * | 8/2022 | B60W 30/095 |
| JP | 7226304 | B2 * | 2/2023 | |
| JP | 2023026181 | A * | 2/2023 | |
| JP | 2023026182 | A * | 2/2023 | |
| JP | 7408695 | B2 * | 1/2024 | B60W 60/0013 |
| WO | WO-2025041530 | A1 * | 2/2025 | G08G 1/16 |

* cited by examiner

METHOD AND APPARATUS FOR CONTROLLING VEHICLE

CROSS-REFERENCE TO RELATED APPLICATION

This application claims priority to Korean Patent Application No. 10-2024-0051397, filed on Apr. 17, 2024, in the Korea Intellectual Property Office, the entire contents of which are incorporated herein by reference.

TECHNICAL FIELD

The present disclosure relates to a method and apparatus for controlling vehicles. More specifically, the present disclosure relates to a method and apparatus for controlling vehicles for lateral collision prevention.

BACKGROUND

The content described below simply provides background information related to the present embodiment and does not constitute prior art.

In order to reduce the burden on the drivers and improve convenience, research is being actively conducted on an advanced driver-assistance system (ADAS) that is capable of actively providing information about a vehicle status, a driver status, and a surrounding environment.

An example of the advanced driver assistance system is a collision prevention system (also referred to as a collision avoidance system). The collision prevention system may monitor a speed of a subject vehicle, a speed of a vehicle ahead, a distance between vehicles, and the like. The collision prevention system may also analyze a possibility of collision, transmit a warning signal to the driver based on the analysis results, perform emergency braking or steering on the vehicle to prevent or mitigate collisions. The collision prevention system may include a forward collision-avoidance assist (FCA) system, a lane following assist (LFA) system, a lane keeping assist (LKA) system, and a blind-spot collision warning (BCW) system.

Effective collision avoidance requires accurate analysis of the possibility of collision.

SUMMARY

The present disclosure is to provide a method and apparatus for controlling vehicle to prevent collision with a target approaching not only in a longitudinal direction but also in the lateral direction. More specifically, a main object of the present disclosure is to provide a method and apparatus for controlling vehicle that performs effective collision avoidance by additionally calculating a control time based on the lateral physical value as well as the conventionally used longitudinal physical value and using these as a criterion for determining whether to perform the control and a type of the control.

The problems to be solved by the present invention are not limited to the problems mentioned above, and other problems not mentioned will be clearly understood by those skilled in the art from the description below.

According to one or more example embodiments of the present disclosure, a vehicle control method may be performed by an apparatus of a vehicle. The vehicle control method may include: identifying a target approaching in a lateral direction of the vehicle; determining, based on a current position of the target, a primary lateral control time; determining, based on the primary lateral control time, a collision overlap; determining, based on the collision overlap, a secondary lateral control time; and adjusting, based on the secondary lateral control time, a traveling speed of the vehicle. The collision overlap may indicate what proportion of a lateral width of the vehicle is projected to overlap with a longitudinal width of the target.

The vehicle control method may further include: determining, based on the current position of the target, a primary longitudinal control time; determining, based on the collision overlap, a secondary longitudinal control time; and adjusting, based on the secondary longitudinal control time, the traveling speed of the vehicle.

Adjusting the traveling speed of the vehicle may include: determining, based on the secondary lateral control time and the secondary longitudinal control time, whether a lateral control time threshold and a longitudinal control time threshold are satisfied; and suspending, based on at least one of the lateral control time threshold or the longitudinal control time threshold not being satisfied, transmitting at least one of a warning signal and a braking command.

Adjusting the traveling speed of the vehicle may include: determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a warning signal.

Adjusting the traveling speed of the vehicle may include: determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a primary braking command.

Adjusting the traveling speed of the vehicle may include: determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a secondary braking command.

Determining whether the lateral control time threshold and the longitudinal control time threshold are satisfied may include at least one of: determining that the lateral control time threshold is satisfied based on the current position of the target indicating that a front edge of the target has passed through a reference line; or determining that the longitudinal control time threshold is satisfied based on the current position of the target indicating that a nearest point, on the target, to the vehicle has passed through the reference line.

Determining whether the lateral control time threshold and the longitudinal control time threshold are satisfied may include at least one of: determining that the lateral control time threshold is satisfied based on the current position of the target indicating that a front edge of the target has passed through a reference line; or determining that the longitudinal control time threshold is satisfied based on the current position of the target indicating that a nearest point, on the target, to the vehicle has passed through the reference line.

Determining whether the lateral control time threshold and the longitudinal control time threshold are satisfied may include at least one of: determining that the lateral control time threshold is satisfied based on the current position of the target indicating that a front edge of the target has passed through a reference line; or determining that the longitudinal control time threshold is satisfied based on the current position of the target indicating that a nearest point, on the target, to the vehicle has passed through the reference line.

According to one or more example embodiments of the present disclosure, a vehicle control device may include: a sensor; a controller; and a speed controller. The controller may be configured to: identify, via the sensor, a target approaching in a lateral direction of a vehicle; determine, based on a current position of the target, a primary lateral control time; determine, based on the primary lateral control time, a collision overlap; determine, based on the collision overlap, a secondary lateral control time; and adjust, via the speed controller and based on the secondary lateral control time, a traveling speed of the vehicle. The collision overlap may indicate what proportion of a lateral width of the vehicle is projected to overlap with a longitudinal width of the target.

The controller may be further configured to: determine, based on the current position of the target, a primary longitudinal control time; determine, based on the collision overlap, a secondary longitudinal control time; and adjust, via the speed controller and based on the secondary longitudinal control time, the traveling speed of the vehicle.

The controller may be configured to adjust the traveling speed of the vehicle by: determining, based on the secondary lateral control time and the secondary longitudinal control time, whether a lateral control time threshold and a longitudinal control time threshold are satisfied; and suspending, based on at least one of the lateral control time threshold or the longitudinal control time threshold not being satisfied, transmitting at least one of a warning signal and a braking command.

The controller may be configured to adjust the traveling speed of the vehicle by: determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a warning signal.

The controller may be configured to adjust the traveling speed of the vehicle by: determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a primary braking command.

The controller may be configured to adjust the traveling speed of the vehicle by: determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a secondary braking command.

The controller may be configured to determine whether the lateral control time threshold and the longitudinal control time threshold are satisfied by at least one of: determining that the lateral control time threshold is satisfied based on the current position of the target indicating that a front edge of the target has passed through a reference line; or determining that the longitudinal control time threshold is satisfied based on the current position of the target indicating that a nearest point, on the target, to the vehicle has passed through the reference line.

The controller may be configured to determining of whether the lateral control time threshold and the longitudinal control time threshold are satisfied by at least one of: determining that the lateral control time threshold is satisfied based on the current position of the target indicating that a front edge of the target has passed through a reference line; and determining that the longitudinal control time threshold is satisfied based on the current position of the target indicating that a nearest point, on the target, to the vehicle has passed through the reference line.

The controller may be configured to determine whether the lateral control time threshold and the longitudinal control time threshold are satisfied by at least one of: determining that the lateral control time threshold is satisfied based on the current position of the target indicating that a front edge of the target has passed through a reference line; and determining that the longitudinal control time threshold is satisfied based on the current position of the target indicating that a nearest point, on the target, to the vehicle has passed through the reference line.

BRIEF DESCRIPTION OF THE DRAWINGS

FIG. 6A is a diagram for explaining a method of determining which of a collision case 4 to a collision case 6 the case corresponds to.

FIG. 6B is a diagram for explaining a method of determining which of the collision case 4 to the collision case 6 the case corresponds to.

FIG. 6C is a diagram for explaining a method of determining which of the collision case 4 to the collision case 6 the case corresponds to.

FIG. 7A is a diagram for explaining a method of, when the case does not correspond to any of the collision case 4 to the collision case 6, determining which of a collision case 1 to a collision case 3 the case corresponds to.

FIG. 7B is a diagram for explaining a method of, when the case does not correspond to any of the collision case 4 to the collision case 6, determining which of the collision case 1 to the collision case 3 the case corresponds to.

FIG. 7C is a diagram for explaining a method of, when the case does not correspond to any of the collision case 4 to the collision case 6, determining which of the collision case 1 to the collision case 3 the case corresponds to.

DETAILED DESCRIPTION

Figure 1:
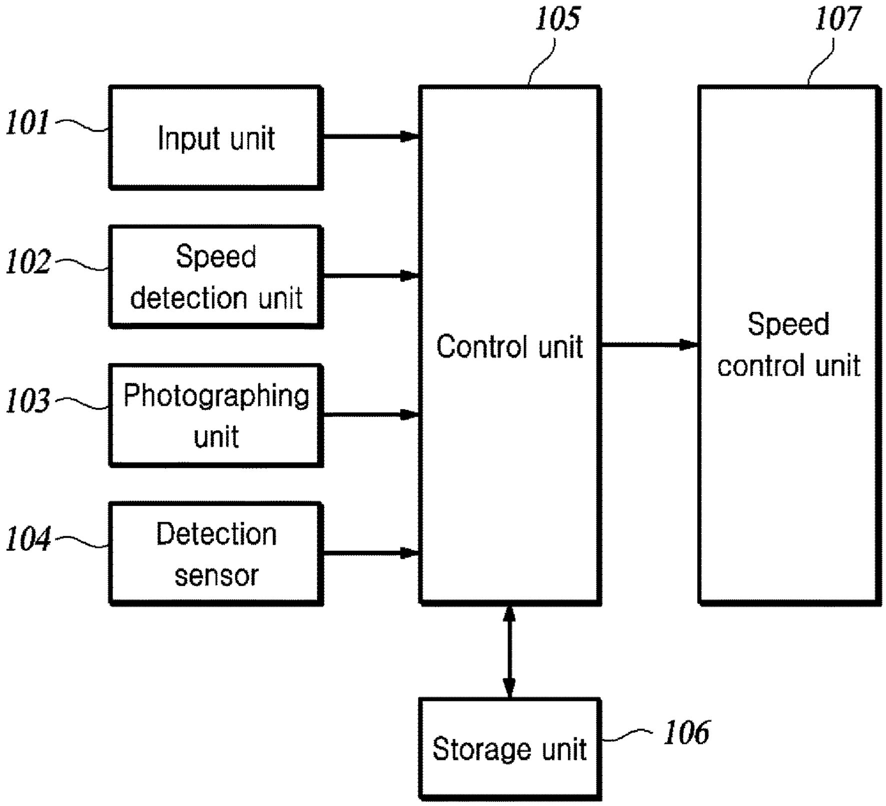
FIG. 1 is a block diagram of a device according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

When analyzing the possibility of a collision, a forward collision-avoidance assist system of some implementations may use a method of calculating an expected time to collision (TTC) based on a relative speed and a relative distance between a subject vehicle and a target (e.g., vehicle in front, a pedestrian, a bicycle, or the like), and determining a control time of the subject vehicle based on the determined time to collision.

In these implementations, the physical values (relative speed, relative distance, or the like) in the longitudinal direction are typically considered, and accurate estimation of an expected time to collision may not be feasible for a target approaching in a lateral direction in a traveling direction of the subject vehicle. Thus, it may be difficult or impossible with these some of these implementations to accurately determine the control time of the subject vehicle.

Furthermore, in the case of targets approaching in the lateral direction, the targets may be located at a periphery of a detection area of a sensor (e.g., towards the boundary limits of the sensor's range), and the physical values (relative speed, relative distance, or the like) may not be accurately collected. Thus, it may not be possible to accurately determine an expected time to collision to collision. In other words, the control time of the subject vehicle may not be accurately determined.

The inaccurate calculation and determination regarding the expected time to collision and control time may lead to inaccurate or unideal control of the subject vehicle, making it difficult to ensure the safety of the vehicle.

There is a need for technology for methods and devices that can more accurately determine the expected time to collision and accurately determine the timing of the control.

An automation level of an autonomous driving vehicle may be classified as follows, according to the American Society of Automotive Engineers (SAE). At autonomous driving level 0, the SAE classification standard may correspond to “no automation,” in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to “driver assistance,” in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to “partial automation,” in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to “conditional automation,” in which the system drives the vehicle (e.g., performs driving functions such as steering, acceleration, and/or braking) under limited conditions but transfer driving control to the driver when the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to “high automation,” in which the system performs all driving functions, and the driver is expected to take control of the vehicle only in emergency situations. At autonomous driving level 5, the SAE classification standard may correspond to “full automation,” in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein. One or more features associated with autonomous driving control may be activated based on configured autonomous driving control setting(s) (e.g., based on at least one of: an autonomous driving classification, a selection of an autonomous driving level for a vehicle, etc.).

Based on one or more features (e.g., determining primary and secondary control times) described herein, an operation of the vehicle may be controlled. The vehicle control may include various operational controls associated with the vehicle (e.g., autonomous driving control, sensor control, braking control, braking time control, acceleration control, acceleration change rate control, alarm timing control, forward collision warning time control, etc.). For example, a traveling speed of the vehicle may be adjusted (e.g., increased, decreased, etc.) based on one or more features (e.g., determining primary and secondary control times) described herein.

One or more auxiliary devices (e.g., engine brake, exhaust brake, hydraulic retarder, electric retarder, regenerative brake, etc.) may also be controlled, for example, based on one or more features (e.g., determining primary and secondary control times) described herein. One or more communication devices (e.g., a modem, a network adapter, a radio transceiver, an antenna, etc., that is capable of communicating via one or more wired or wireless communication protocols, such as Ethernet, Wi-Fi, near-field communication (NFC), Bluetooth, Long-Term Evolution (LTE), 5G New Radio (NR), vehicle-to-everything (V2X), etc.) may also be controlled, for example, based on one or more features (e.g., determining primary and secondary control times) described herein.

Minimum risk maneuver (MRM) operation(s) may also be controlled, for example, based on one or more features (e.g., determining primary and secondary control times) described herein. A minimal risk maneuvering operation (e.g., a minimal risk maneuver, a minimum risk maneuver) may be a maneuvering operation of a vehicle to minimize (e.g., reduce) a risk of collision with surrounding vehicles in order to reach a lowered (e.g., minimum) risk state. A minimal risk maneuver may be an operation that may be activated during autonomous driving of the vehicle when a driver is unable to respond to a request to intervene. During the minimal risk maneuver, one or more processors of the vehicle may control a driving operation of the vehicle for a set period of time.

Biased driving operation(s) may also be controlled, for example, based on one or more features (e.g., determining primary and secondary control times) described herein. A driving control apparatus may perform a biased driving control. To perform a biased driving, the driving control apparatus may control the vehicle to drive in a lane by maintaining a lateral distance between the position of the center of the vehicle and the center of the lane. For example, the driving control apparatus may control the vehicle to stay in the lane but not in the center of the lane.

The driving control apparatus may identify a biased target lateral distance for biased driving control. For example, a biased target lateral distance may comprise an intentionally adjusted lateral distance that a vehicle may aim to maintain from a reference point, such as the center of a lane or another vehicle, during maneuvers such as lane changes. This adjustment may be made to improve the vehicle’s stability, safety, and/or performance under varying driving conditions, etc. For example, during a lane change, the driving control system may bias the lateral distance to keep a safer gap from adjacent vehicles, considering factors such as the vehicle’s speed, road conditions, and/or the presence of obstacles, etc.

One or more sensors (e.g., IMU sensors, camera, LIDAR, RADAR, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, inverter, converter, motor controller, power distribution unit, high-voltage wiring and connectors, auxiliary power modules, charging interface, etc.) may also be controlled, for example, based on one or more features (e.g., determining primary and secondary control times) described herein.

An operation control for autonomous driving of the vehicle may include various driving control of the vehicle by the vehicle control device (e.g., acceleration, deceleration, steering control, gear shifting control, braking system control, traction control, stability control, cruise control, lane keeping assist control, collision avoidance system control, emergency brake assistance control, traffic sign recognition control, adaptive headlight control, etc.).

The following detailed description, together with the accompanying drawings, is intended to describe exemplary embodiments of the present invention, and is not intended to represent the only embodiments in which the present invention may be practiced.

FIG. 1 is a block diagram of a device according to one embodiment of the present disclosure. As illustrated in FIG. 1, a block diagram of a device according to one embodiment of the present disclosure includes all or some of an input unit (also referred to as an input interface) 101, a speed detection unit (also referred to as a speed detector or a speedometer) 102, a photographing unit (also referred to a photographing device or a camera) 103, a detection sensor (also referred to as a sensor) 104, a control unit (also referred to as a controller) 105, a storage unit (also referred to as storage or data storage) 106, and a speed control unit (also referred to as a speed controller or a speed control device) 107. Not all blocks illustrated in FIG. 1 are essential components, and some blocks included in the block diagram of the device may be added, changed, or deleted in other embodiments. Meanwhile, the components illustrated in FIG. 1 represent functionally distinct elements, and at least one component may be implemented in an integrated form in an actual physical environment.

The input unit 101 may be implemented using a physical button, knob, touch pad, touch screen, stick-type operating device, or trackball. The driver may control various operations of the vehicle by manipulating the input unit 101.

The speed detection unit 102 may detect a speed of a subject vehicle under the control of the control unit 105. The traveling speed may be detected using the speed at which wheels of the vehicle rotate.

The photographing unit 103 may recognize the type of target by photographing a target around the vehicle and determining the shape of the photographed target using an image recognition technique, and transmit the recognized information to the control unit 105. There is no limit to the position where the photographing unit 103 is installed, and it can be installed anywhere where image information can be obtained by photographing the inside or outside of the vehicle. The photographing unit 103 may include at least one camera, and may include a 3D spatial recognition sensor, a radar sensor, an ultrasonic sensor to obtain a more accurate image, and the like.

The detection sensor 104 may detect a target approaching from the front, side, or rear of the vehicle and obtain position information and speed information of the target. In other words, the detection sensor 104 may acquire coordinate information changed as the target moves in real time. That is, a lateral distance and a longitudinal distance between the subject vehicle and the target may be detected, and based on these, the lateral speed information and longitudinal speed information may be obtained.

The control unit 105 may perform electronic control for each component related to the operation of the vehicle. At least one control unit 105 may be provided inside the vehicle. When the detection sensor 104 detects the target approaching in the lateral direction of the vehicle (e.g., in a direction parallel to a lateral axis of the vehicle), the control unit 105 may primarily (e.g., for a first time) control the lateral direction control time and the longitudinal control time (hereinafter, referred to as a "primary lateral control time" and a "primary longitudinal control time") based on the current position of the target. Based on the above calculation results, the control unit determines (e.g., calculates) the collision overlap and determines the type of collision case. A collision case may be also referred to as collision classifications, collision categories, collision classifications, collision levels, etc. and indicate a degree of severity of a predicted collision between the vehicle and the target. The determination processes are made taking into account the inherent inaccuracy (e.g., margins of error) of sensor measurements. In particular, it is performed based on the lateral control time determination results. After the type of collision case is determined, the lateral control time and longitudinal control time (hereinafter, referred to as a "secondary lateral control time" and a "secondary longitudinal control time") may be determined secondarily (e.g., for a second time) by considering the corresponding case. It is determined whether the lateral control time standard and the longitudinal control time standard are satisfied, and depending on the determination result, it is determined whether to transmit a warning signal or braking command to the speed control unit 107. The control unit 105 transmits the warning signal or the braking command when the target satisfies both of the above two standards. A control time may also be referred to as a control time point, control timing, a point in time for control, etc.

The storage unit 106 may store various data related to vehicle control. Specifically, information about the traveling speed, traveling distance, and traveling time of the vehicle may be stored. The storage unit 106 may store the position information and the speed information of the target detected/recognized by the photographing unit 103 or the detection sensor 104, store coordinate information that changes in real time for a moving target, and store information about a relative distance and a relative speed between the vehicle and the target. The storage unit 106 may store data related to expressions and control algorithms for controlling the vehicle. The control unit 105 may transmit control signals (warning signals, braking commands, or the like) that control the vehicle according to the expressions and control algorithms. This storage unit 106 may be implemented by at least one of a non-volatile memory element such as cache, read only memory (ROM), programmable ROM (PROM), erasable programmable ROM (EPROM), electrically erasable programmable ROM (EEPROM), and flash memory, a volatile memory element such as random-access memory (RAM), and a storage medium such as a hard disk drive (HDD) or compact disc ROM (CD-ROM), but is not limited thereto.

The speed control unit 107 can control the speed of the subject vehicle. The speed control unit 107 may include an accelerator driving unit (not illustrated) and a brake driving unit (not illustrated). The control unit 105 may determine the expected time to collision between the vehicle and the target based on the relative distance and the relative speed between the vehicle and the target, determine the control time based on the determined expected time to collision, and transmit a signal for controlling the traveling speed of the vehicle to the speed control unit 107 based on the determined control time.

Figure 2:
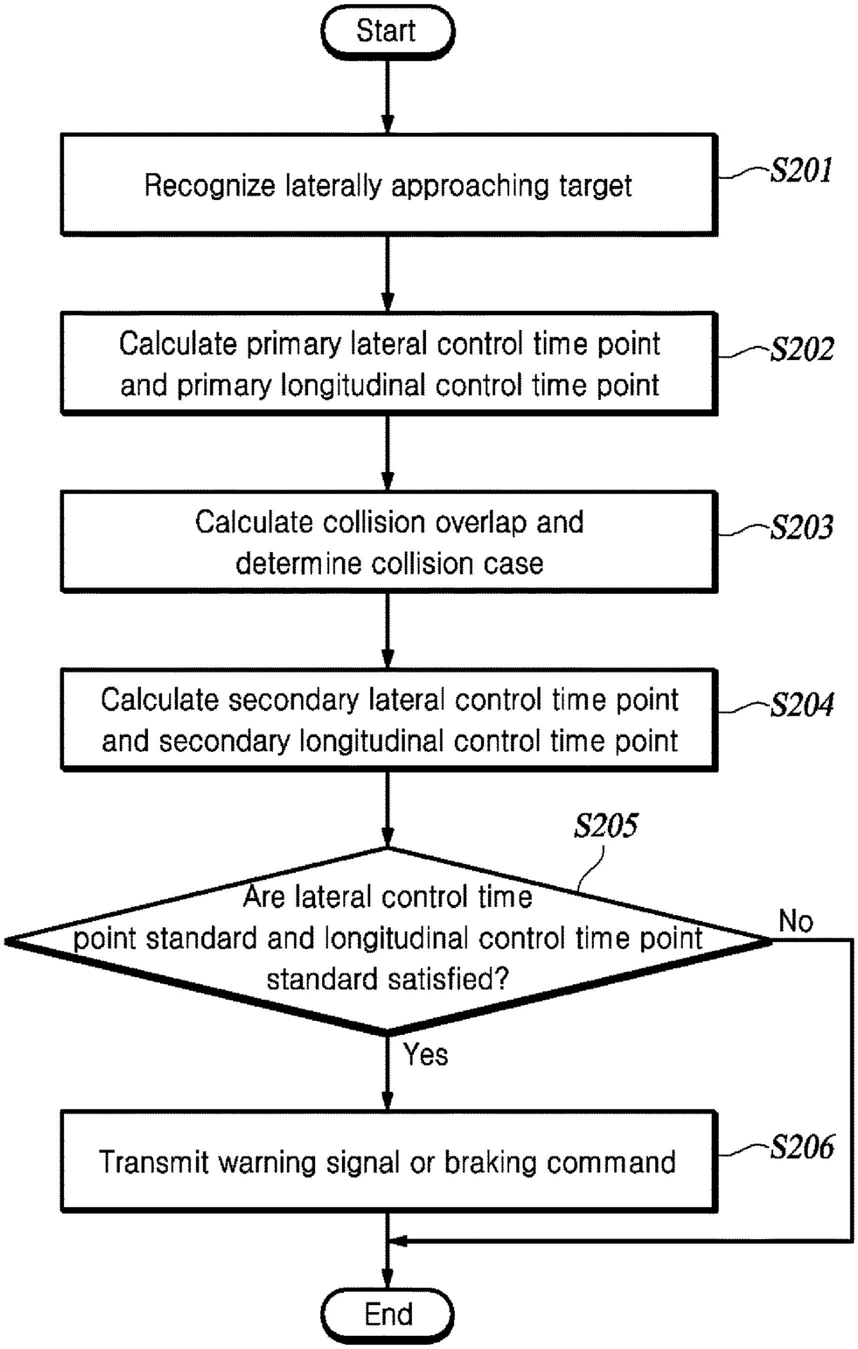
FIG. 2 is a flowchart of a vehicle control method according to one embodiment of the present disclosure.

FIG. 2 is a flowchart of a vehicle control method according to one embodiment of the present disclosure. The photographing unit 103 or detection sensor 104 may recognize the target approaching the vehicle. The control unit 105 can determine whether a target is approaching in a lateral direction of the vehicle (e.g., in a direction parallel to a lateral axis of the vehicle) based on the position information or speed information of the vehicle collected by the photographing unit 103 or the detection sensor 104 (S201). This may also be analyzed based on the relative position information or the relative speed information between the vehicle and the target. The position information and speed information of the target, the relative position information between the vehicle and the target, the relative speed information between the vehicle and the target, or the like may be stored in the storage unit 106.

The control unit 105 determines the primary lateral control time and primary longitudinal control time (S202). Hereinafter, the lateral direction will be explained first.

The control unit 105 determines the primary lateral control time based on the speed information of the subject vehicle measured by the speed detection unit 102 and the position information or speed information of the target recognized by the photographing unit 103 or detection sensor 104. The control unit 105 has two types of situations: 1) a situation where the target is steered and merges into the lane next to the subject vehicle; and 2) a situation where the target applies the brakes and stops before the target enters the path of the subject vehicle. In each situation, the distance needed to avoid collision between the target and the subject vehicle is determined. The primary lateral control time is determined by calculating the minimum value (Min) of the two values. A specific method of calculating the primary lateral control time will be explained in FIG. 3A and FIG. 3B.

The control unit 105 can determine the primary longitudinal control time. The basic calculation method is the same as that of the lateral direction. A specific method of calculating the primary longitudinal control time will be described in FIG. 4.

The control unit 105 determines the collision overlap and determines the collision case (S203). The collision cases may have 6 situations (e.g., classifications, categories, classifications, levels, etc.) from 1 to 6. Collision case 1 through collision case 3 represent situations where the subject vehicle collides with a side surface of the target. Collision case 4 represents a situation where the target passes the subject vehicle and the subject vehicle does not collide with the target. Collision case 5 represents a situation where the target is stopped and the subject vehicle does not collide with the target. Collision case 6 represents a situation where the target steers and enters the front of the subject vehicle and merges on the same path without colliding with the subject vehicle. There are differences in the collision overlap calculation method for each collision case. The method of calculating collision overlap and the method of determining collision cases will be explained in FIG. 5A to FIG. 5C, FIG. 6A to FIG. 6C, and FIG. 7A to FIG. 7C below.

The control unit 105 determines the secondary lateral control time and secondary longitudinal control time (S204). Hereinafter, the lateral direction will be explained first.

The control unit 105 determines the secondary lateral control time according a method of modifying the primary lateral control time based on the collision case. However, in some collision cases, the primary lateral control time is not modified. That is, in some collision cases, the secondary lateral control time is the same as the primary lateral control time. The specific method of calculating the secondary lateral control time is described in FIG. 8A to FIG. 8H.

The control unit 105 may determine a secondary longitudinal control time. The basic calculation method is the same as that of the lateral direction. A specific method of calculating the secondary longitudinal control time will be described in FIG. 9A to FIG. 9H.

The control unit 105 determines whether the lateral control time standard and longitudinal control time standard are satisfied based on the determination results of the secondary lateral control time and secondary longitudinal control time (S205).

When the standards are satisfied, the control unit 105 transmits the warning signal or the braking command (S206). When it is determined that both the lateral control time standard and longitudinal control time standard are satisfied, the warning signal or the braking command is sent. When either of the two standards is not satisfied, neither the warning signal nor the braking command is transmitted. Hereinafter, the application of the method and apparatus for controlling vehicle according to one embodiment of the present disclosure will be described for each collision case using FIG. 10A, FIG. 10B, FIG. 11A, FIG. 11B, FIG. 12A, FIG. 12B, FIG. 13A, and FIG. 13B.

Figure 3A:
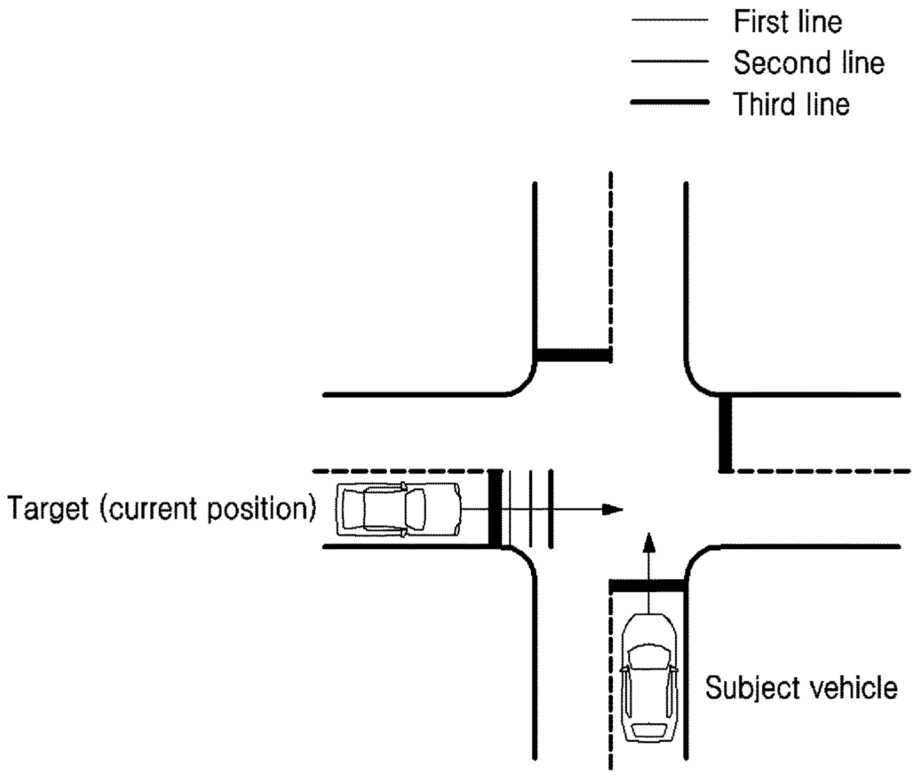
FIG. 3A is a diagram for explaining a specific method of calculating a primary lateral control time.
Figure 3B:
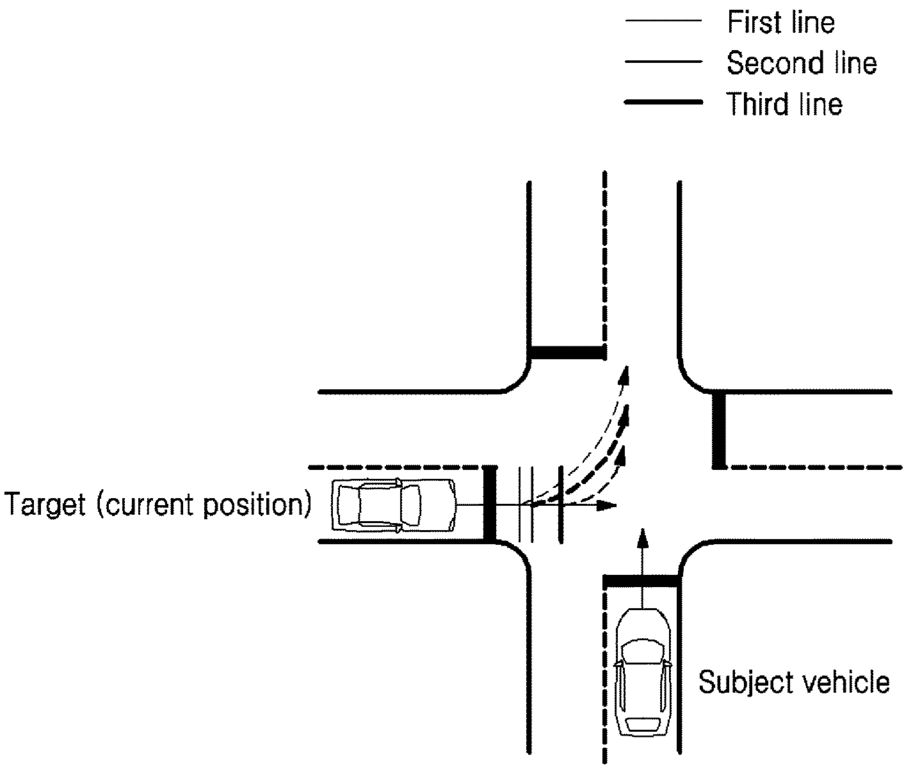
FIG. 3B is a diagram for explaining a specific method of calculating a primary lateral control time.

FIG. 3A is a diagram for explaining a specific method of calculating the primary lateral control time. FIG. 3B is a diagram for explaining a specific method of calculating the primary lateral control time. The control unit 105 classifies the situation into two types of situations: 1) a situation where the target steers and merges into a lane next to the subject vehicle; and 2) a situation where the target applies the brakes and stops before the target enters the path of the subject vehicle. In each situation, the distance needed to avoid collision between the target and the subject vehicle is determined. FIG. 3A illustrates a situation where the target applies the brakes and stops before the target enters the path of the subject vehicle. FIG. 3B illustrates a situation where the target steers and merges into the next lane.

Equation 1 is an equation that determines the distance (Lateral Warning Distance Steer) required to avoid a collision between the target and the subject vehicle in the situation where the target steers and merges into the next lane. $a_y$ refers to a lateral acceleration of the subject vehicle, $V_y$ refers to a lateral speed of the subject vehicle, and Lane Width refers to a width of a traveling lane.

Equation 2 is an equation that determines the distance (Lateral Warning Distance Brake) required for the target and the vehicle to not collide in a situation where the target applies the brakes and stops before the target enters the path of the vehicle. $a_y$ refers to the lateral acceleration of the subject vehicle, $V_y$ refers to the lateral speed of the subject vehicle, and Vehicle Half Width refers to half the width of the subject vehicle.

The control unit 105 determines the primary lateral control time by calculating the minimum value (Min) of the two values. Equation 3 is an equation that determines the minimum value of the values obtained using Equation 1 and Equation 2 to determine the primary lateral control time.

$$\text{Lateral Warning Distance Steer} = sqrt\left\{(\text{Target Length}) * \frac{2}{a_y}\right\} * V_y + \text{Lane Width} \quad \text{[Equation 1]}$$

$$\text{Lateral Warning Distance Brake} = \frac{V_y^2}{2a_y} + 0.8 * V_y + \text{Vehicle Half Width} \quad \text{[Equation 2]}$$

$$\text{Lateral Warning Distance} = \text{Min}(\text{Lateral Warning Distance Steer}, \text{Lateral Warning Distance Brake}) \quad \text{[Equation 3]}$$

The control unit 105 determines the primary lateral control time based on Equation 3 and the longitudinal traveling speed of the subject vehicle. Considering a current gap between the target and the subject vehicle, in a case where the target proceeds toward the subject vehicle while maintaining the current speed, the standard is set on whether the subject vehicle transmits the warning signal or braking command when the target has advanced to a certain distance. In FIG. 3A and FIG. 3B, the corresponding standard is indicated as "distance" in the lateral direction from the target, but in the present disclosure, the term "control time" (e.g., control time point, control timing, point in time for control) is used for convenience.

The first, second, and third lines in FIGS. 3A and 3B are lines indicating the control time. When the target passes the first line, the control unit 105 transmits the warning signal, when the target passes the second line, the control unit 105 transmits a primary braking command, and when the target passes the third line, the control unit 105 transmits a secondary braking command. In other words, each line is a standard for determining the type and time of control to be performed by the control unit 105.

Figure 4:
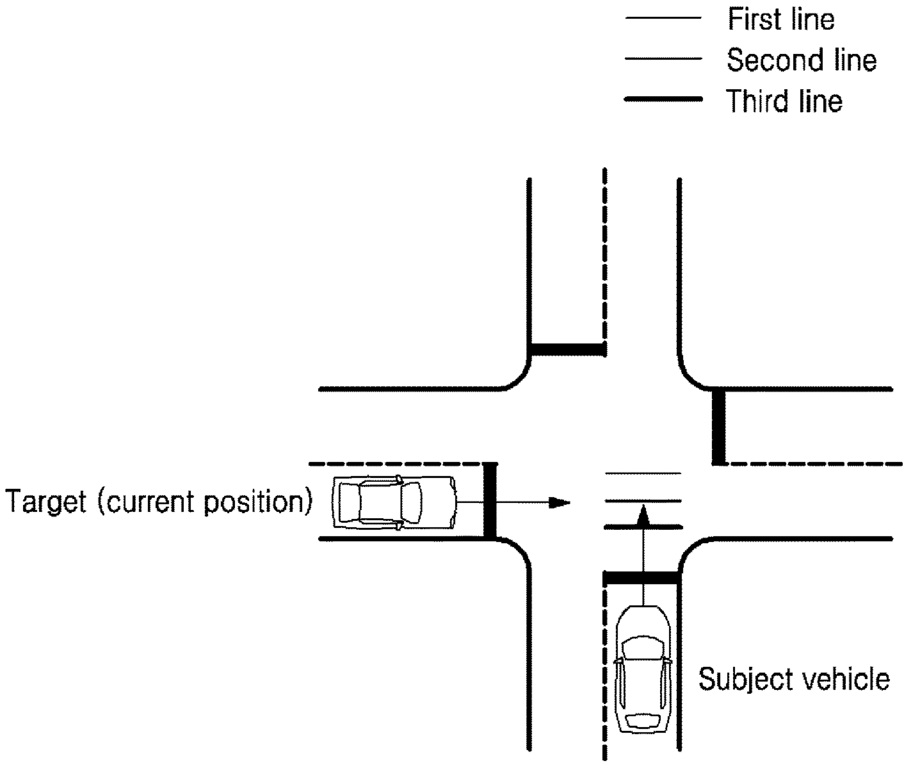
FIG. 4 is a diagram for explaining a specific method of calculating a primary longitudinal control time.

FIG. 4 is a diagram for explaining a specific method of calculating the primary longitudinal control time. The control unit 105 classifies the situation into two types of situations: 1) a situation where the subject vehicle steers to avoid the target; and 2) a situation where the subject vehicle applies the brakes and stops before the target enters the path of the subject vehicle. In each situation, the distance needed to avoid collision between the target and the subject vehicle is determined.

Equation 4 is an equation that determines the distance (Longitudinal Warning Distance Steer) required to avoid a collision between the target and the subject vehicle in a situation where the subject vehicle steers to avoid the target. $a_y$ refers to the lateral acceleration of the subject vehicle, and $V_x$ refers to the longitudinal speed of the subject vehicle.

Equation 5 is an equation that determines the distance (Longitudinal Warning Distance Brake) required for the target and the vehicle to not collide in a situation where the subject vehicle applies the brakes and stops before the target enters the path of the vehicle. $a_x$ refers to the longitudinal acceleration of the vehicle, $V_x$ refers to the longitudinal speed of the subject vehicle, and Buffer Distance refers to the minimum distance maintained.

The control unit 105 determines the primary longitudinal control time by calculating the minimum value (Min) of the two values. Equation 6 is an equation that determines the minimum value of the values obtained using Equations 4 and 5 to determine the primary longitudinal control time.

$$\text{Longitudinal Warning Distance Steer} = sqrt\left\{(\text{Target Width}) * \frac{2}{a_y}\right\} * V_x \quad \text{[Equation 4]}$$

$$\text{Longitudinal Warning Distance Brake} = \frac{V_x^2}{2a_x} + 0.8 * V_x + \text{Buffer Distance} \quad \text{[Equation 5]}$$

$$\text{Longitudinal Warning Distance} = \text{Min}(\text{Longitudinal Warning Distance Steer}, \text{Longitudinal Warning Distance Brake}) \quad \text{[Equation 6]}$$

The control unit 105 determines the primary longitudinal control time based on Equation 6 and the longitudinal traveling speed of the subject vehicle. Considering the current gap between the target and the subject vehicle, in a case where the target proceeds toward the subject vehicle while maintaining the current speed, the standard is set on whether the control unit 105 transmits the warning signal or braking command when the subject vehicle has traveled by a certain distance. In FIG. 4, the corresponding standard is indicated as "distance" in the longitudinal direction from the subject vehicle, but in the present disclosure, the term "control time" is used for convenience.

The first, second, and third lines in FIG. 4 are lines indicating the control time. When the subject vehicle passes the first line, the control unit 105 transmits the warning signal, when the subject vehicle passes the second line, the control unit 105 transmits the primary braking command, and when the subject vehicle passes the third line, the control unit 105 transmits the secondary braking command. Each line is a standard for determining the type and time of the control to be performed by the control unit 105.

Figure 5A:
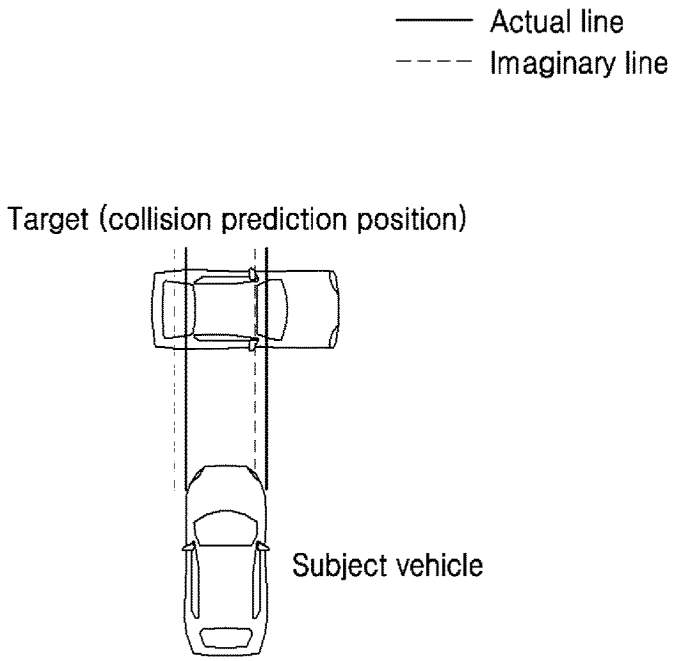
FIG. 5A is a diagram to explain a method of calculating collision overlap.
Figure 5B:
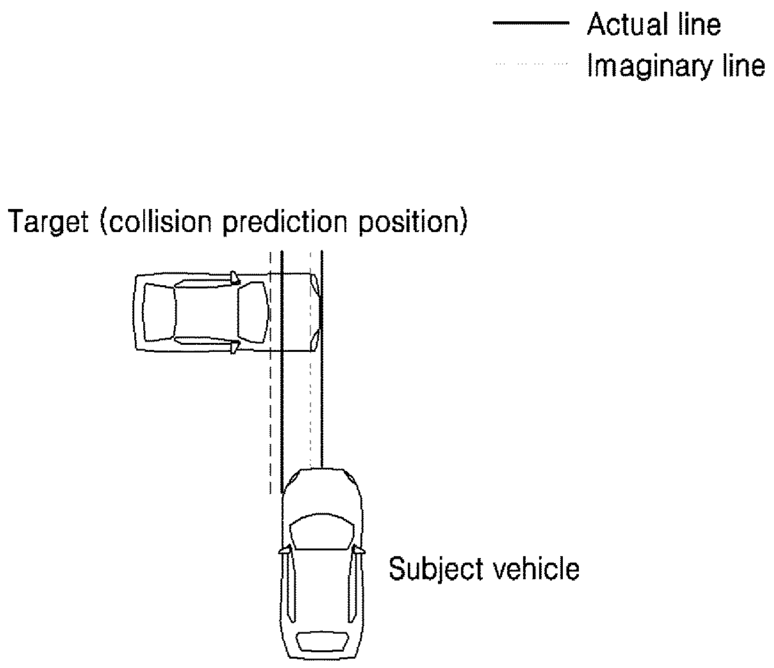
FIG. 5B is a diagram to explain a method of calculating collision overlap.
Figure 5C:
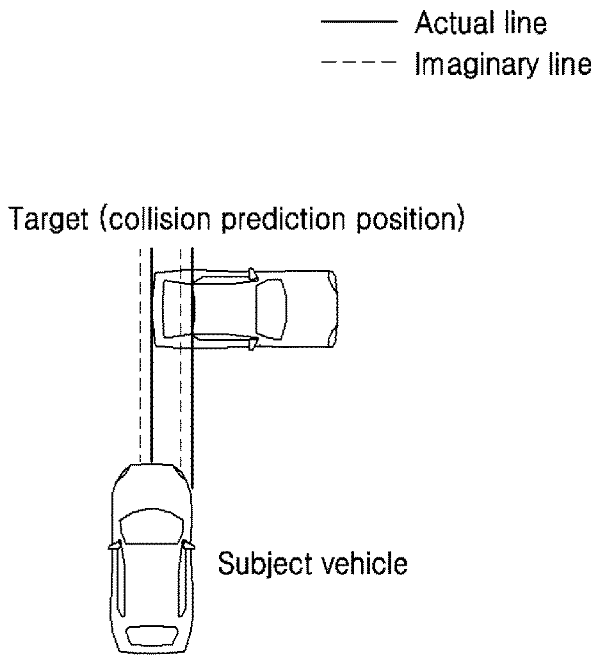
FIG. 5C is a diagram to explain a method of calculating collision overlap.

FIG. 5A is a diagram to explain a method of calculating the collision overlap. FIG. 5B is a diagram to explain a method of calculating the collision overlap. FIG. 5C is a diagram to explain a method of calculating the collision overlap. The collision overlap (also referred to as a predicted collision overlap or a projected collision overlap) refers to the degree (e.g., rate, proportion, etc.) to which a front width (e.g., lateral width) of the subject vehicle overlaps (e.g., is projected to overlap) with a side width (e.g., longitudinal width) of the target. The collision overlap is determined based on a predicted collision position of the target, not the current position of the target. The predicted collision position of the target refers to the position of the target at the time when the subject vehicle and the target are expected to collide if the subject vehicle and the target proceed were to maintain the current states (e.g., speeds, headings, etc.) thereof.

In calculating the collision overlap, it is necessary to define an imaginary line. The imaginary line represents the left and right boundaries of the subject vehicle. The imaginary line is deviated to the left by a certain amount compared to the line representing actual left and right boundaries of the subject vehicle. This is because there is a delay in input of the target position due to the inaccuracy of sensor measurement. In order to eliminate errors, the front width of the subject vehicle in the direction in which the target approaches is adjusted to be wide, and the front width of the vehicle in the direction in which the target is leaving is adjusted to be narrow. The degree to which the imaginary line is biased to the left compared to the actual line may be different on the left and right sides of the vehicle.

The collision overlap has different calculation methods for each collision case. First, in case of the collision case 2 or the collision case 6, the calculation is not required. In the case of the collision case 2 and collision case 6, the collision overlap is 100%, because the front width of the subject vehicle and the side width of the target completely overlap at the collision prediction position. FIG. 5A illustrates this.

In the other collision cases, that is, when the front width of the subject vehicle only partially with the side width of the target or does not entirely overlap with the side width of the target, the method of calculating the collision overlap is changed depending on whether a part or the entirety of the front left width of the subject vehicle does not overlap with the side width of the target, or whether a part or the entirety of the front right width of the subject vehicle does not overlap with the side width of the target.

In a case where a part or the entirety of the front right width of the subject vehicle does not overlap with the side width of the target, the case corresponds to the collision case 3 or the collision case 5. In the collision case 3 or collision case 5, unlike the existing method of calculating the collision overlap based on an imaginary line indicating the right boundary of the subject vehicle, the collision overlap is determined based on an imaginary line indicating the front boundary (e.g., the front edge) of the target. The collision overlap is determined based on the imaginary line representing the left boundary of the subject vehicle and the imaginary line representing the front boundary of the target. Equation 7 is an equation for calculating the collision overlap in the case of the collision case 3 or collision case 5. In Equation 7, a Target Left Side Surface is an imaginary line indicating the left boundary of the subject vehicle, a Target Front Bumper is an imaginary line indicating the front boundary of the target, and a Subject Vehicle Width is the front width of the subject vehicle. Considering the inaccuracy of the sensor, both the left side surface of the target and the front bumper of the target are considered to be biased to the left by a certain amount compared to reality. FIG. 5B illustrates this.

$$\text{Collision Overlap}(\%) = \frac{\text{Target Left Side Surface} - \text{Target Front Bumper}}{\text{Subject Vehicle Width}} * 100 \quad \text{[Equation 7]}$$

In a case where a part or the entirety of the front left width of the subject vehicle does not overlap with the side width of the target, the case corresponds to the collision case 1 or the collision case 4. In the collision case 1 or collision case 4, unlike the existing method of calculating the collision overlap based on the imaginary line representing the left boundary of the subject vehicle, the collision overlap is determined based on the imaginary line representing the rear boundary of the target. The collision overlap is determined based on the imaginary line representing the rear boundary of the target and the imaginary line representing the right boundary of the subject vehicle. Equation 8 is an equation for calculating the collision overlap in the case of the collision case 1 or collision case 4. In Equation 8, a Target Rear Bumper is the imaginary line representing the rear boundary of the target, a Target Right Side Surface is the imaginary line representing the right boundary of the subject vehicle, and a Subject Vehicle Width is the front width of the subject vehicle. Considering the inaccuracy of the sensor, both the target rear bumper and the right side surface of the target are considered to be biased to the left by a certain amount compared to reality. FIG. 5C illustrates this.

$$\text{Collision Overlap}(\%) = \frac{\text{Target Rear Bumper} - \text{Target Right Side Surface}}{\text{Subject Vehicle Width}} * 100 \quad \text{[Equation 8]}$$

Figure 6A:
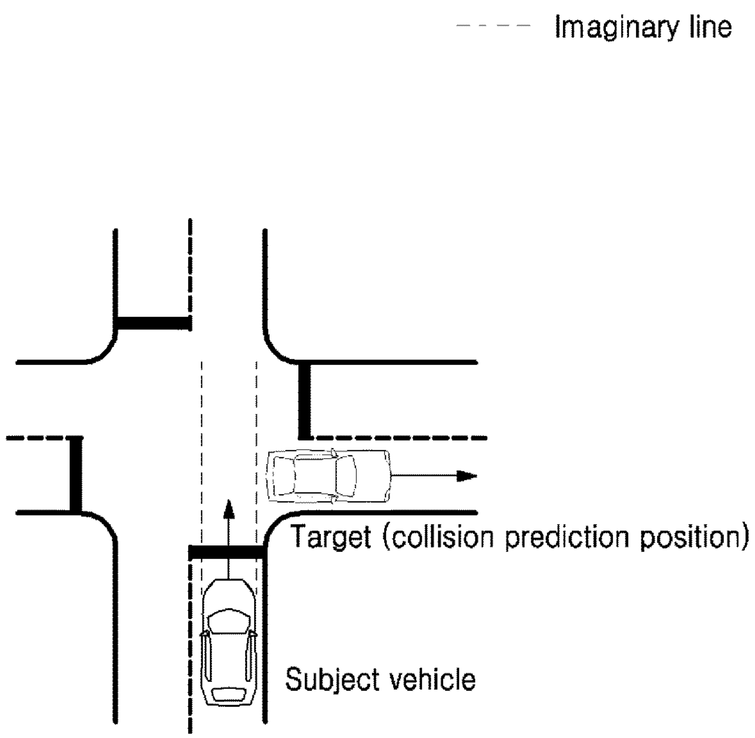
Figure 6B:
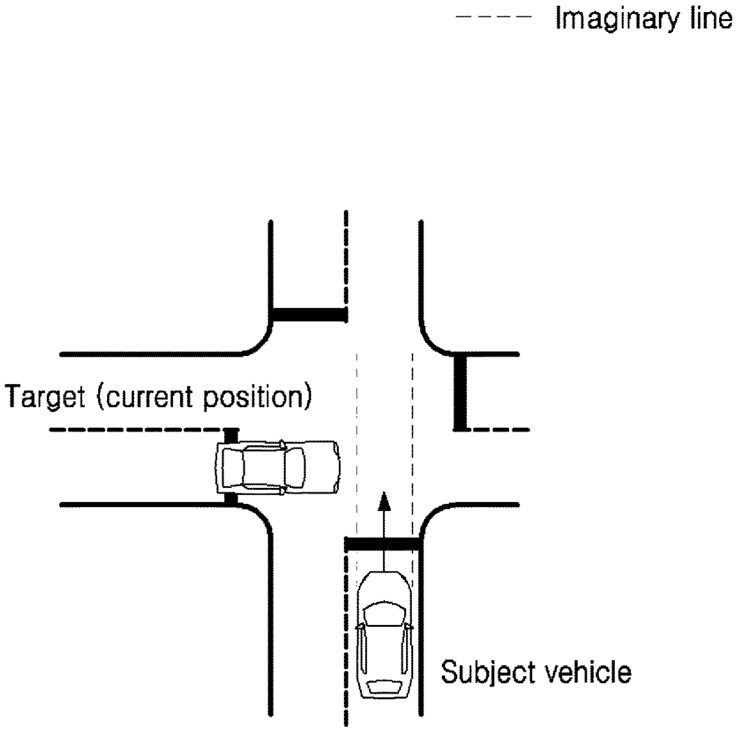
Figure 6C:
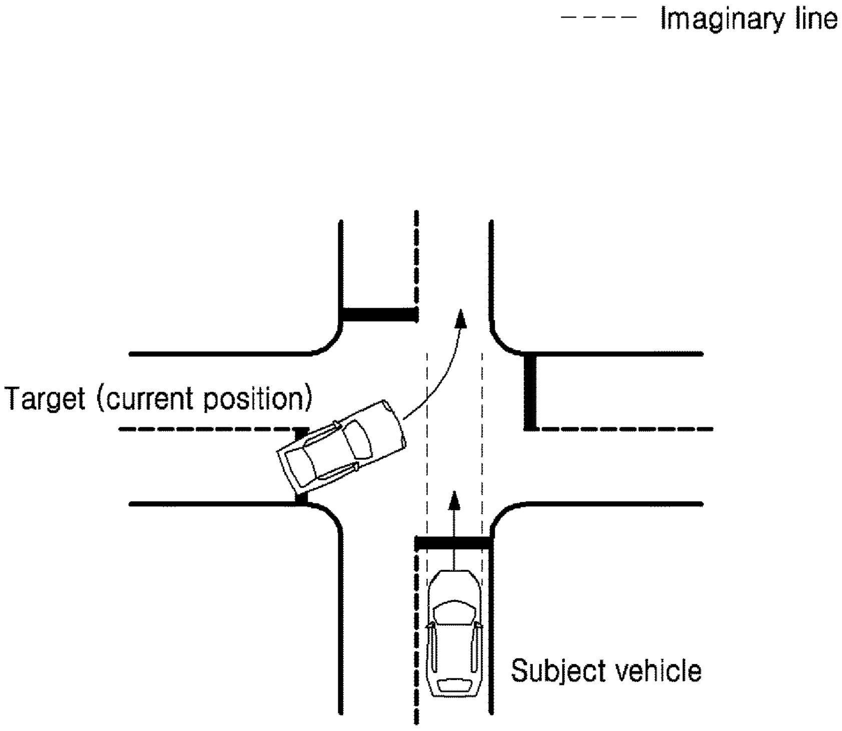

FIG. 6A is a diagram for explaining a method of determining which of the collision case 4 to the collision case 6 the case corresponds to. FIG. 6B is a diagram for explaining a method of determining which of the collision case 4 to the collision case 6 the case corresponds to. FIG. 6C is a diagram for explaining a method of determining which of the collision case 4 to the collision case 6 the case corresponds to. The determination of the collision case is performed by a method of determining that the case corresponds to any of the collision case 4 to the collision case 6, and then, when the case does not correspond to any of the collision case 4 to the collision case 6, determining which of the collision case 1 to the collision case 3 the case corresponds to. Among these, a method of determining which of the collision case 4 to the collision case 6 the case corresponds to will be described with reference to FIG. 6A to FIG. 6C.

When all of the following four standards are satisfied, it is determined that the case corresponds to the collision case 4. The standards are as follows: a part or the entirety of the front left width of the subject vehicle does not overlap with the lateral width of the target; the collision overlap≤a certain value is satisfied; the relative longitudinal distance≥a certain value is satisfied; and the target longitudinal speed≥a certain value is satisfied. FIG. 6A illustrates this.

When all of the following five standards are satisfied, it is determined that the case corresponds to the collision case 5. The standards are as follows: a part or the entirety of the front right width of the subject vehicle does not overlap with the side width of the target, the collision overlap≤a certain value is satisfied; the relative longitudinal distance≥a certain value is satisfied; the target lateral speed≤a certain value (hereinafter referred to as "above situation") is satisfied; a maintenance time of the above situation≥a certain value is satisfied; and the target lateral deceleration≤a certain value is satisfied. FIG. 6B illustrates this.

When all of the following three standards are satisfied, it is determined that the case corresponds to the collision case 6. The standards are as follows: a target heading angle change direction=a merging direction is satisfied; the longitudinal speed of the subject vehicle≥the relative longitudinal speed (hereinafter, referred to as "above situation") is satisfied; and a maintenance time of the above situation≥a certain value is satisfied. FIG. 6C illustrates this.

Figure 7A:
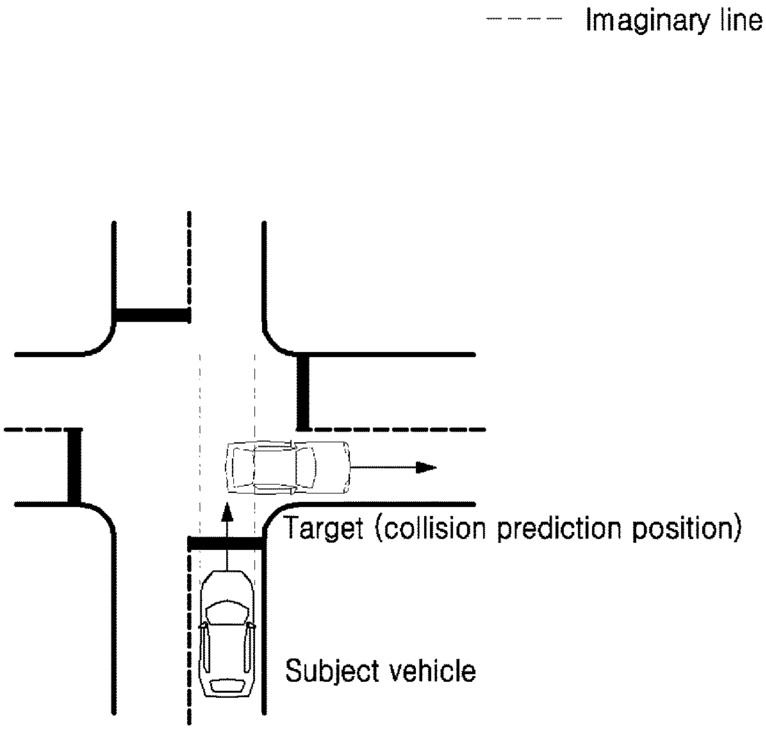
Figure 7B:
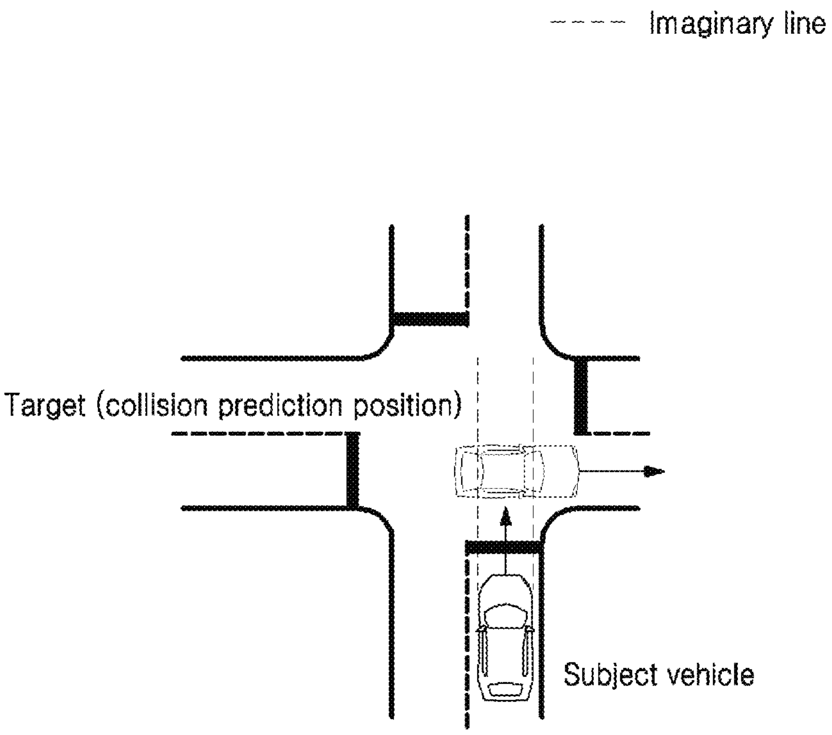
Figure 7C:
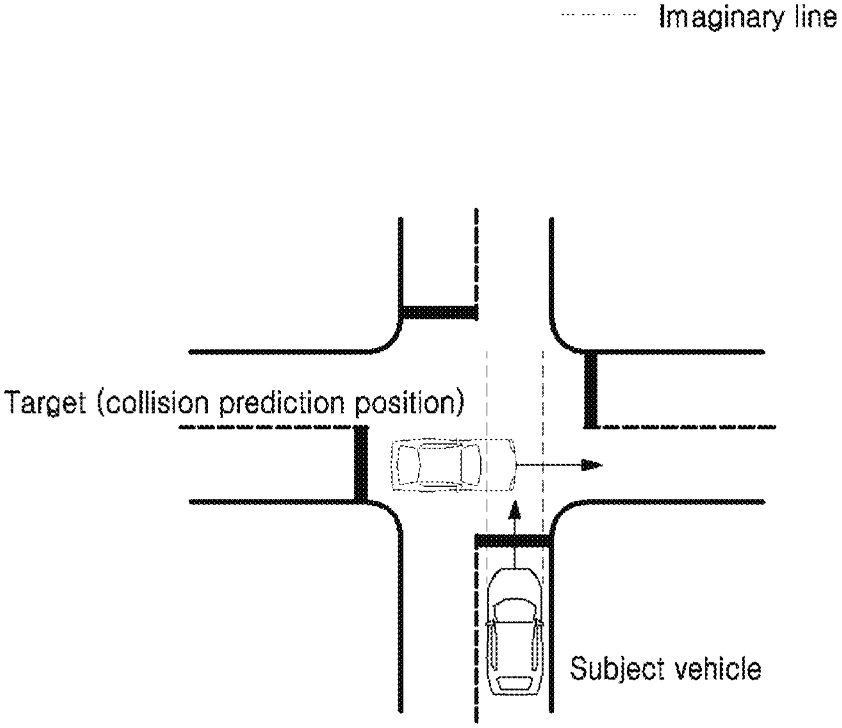

FIG. 7A is a diagram for explaining a method of, when the case does not correspond to any of the collision case 4 to the collision case 6, determining which of collision case 1 to collision case 3 the case corresponds to. FIG. 7B is a diagram for explaining a method of, when the case does not correspond to any of the collision case 4 to the collision case 6, determining which of collision case 1 to collision case 3 the case corresponds to. FIG. 7C is a diagram for explaining a method of, when the case does not correspond to any of the collision case 4 to the collision case 6, determining which of collision case 1 to collision case 3 the case corresponds to.

Which of the collision case 1 to the collision case 3 the case corresponds to is determined based on the collision overlap.

When the imaginary line representing the left boundary of the subject vehicle and the imaginary line representing the right boundary both extend within the side width of the target, the front width of the subject vehicle completely overlaps the side width of the target. Therefore, the collision overlap is 100%, and this case corresponds to the collision case 2. FIG. 7B illustrates this.

When the case does not correspond to the collision case 2, that is, when the front width of the subject vehicle only partially overlaps the side width of the target, it is determined that the case corresponds to the collision case 1 or the collision case 3, depending on whether the left front width of the subject vehicle does not overlap with the side width of the target or the right front width does not overlap with the side width of the target.

In a case where the left front width of the subject vehicle does not partially overlap with the side width of the target, the case corresponds to the collision case 1. FIG. 7A illustrates this.

In a case where the right front width of the subject vehicle does not partially overlap with the side width of the target, the case corresponds to collision case 3. FIG. 7C illustrates this.

Figure 8A:
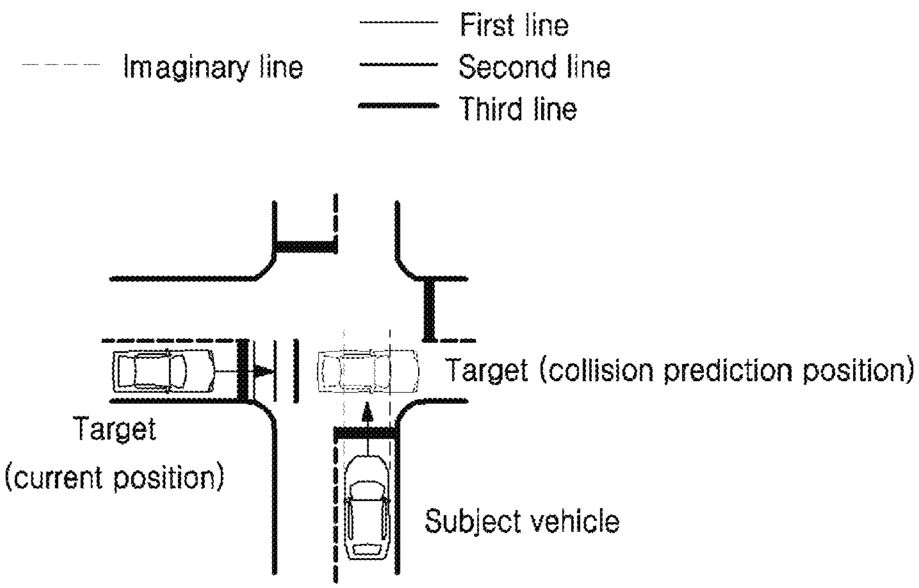
FIG. 8A is a diagram to explain a specific method of calculating a secondary lateral control time in the case of the collision case 1 to the collision case 3.
Figure 8B:
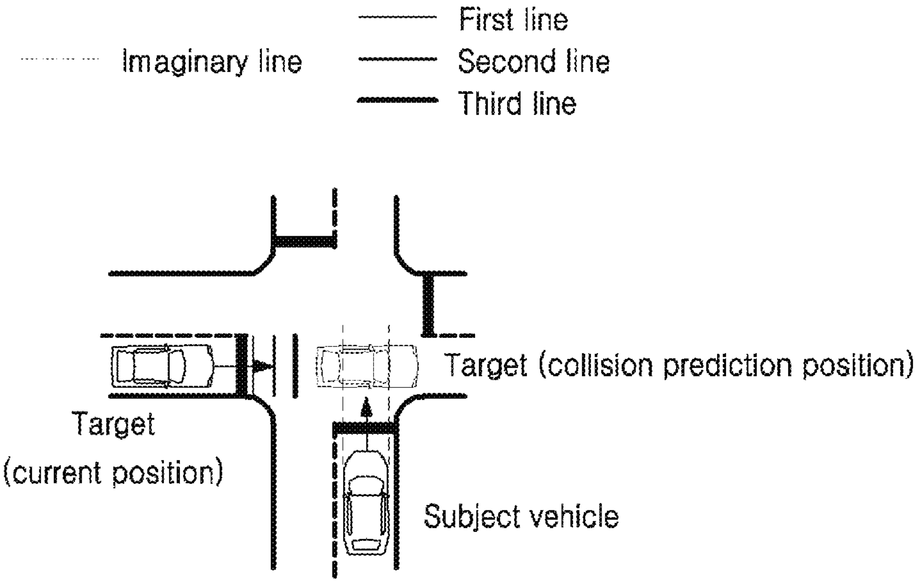
FIG. 8B is a diagram to explain a specific method of calculating a secondary lateral control time in the case of the collision case 1 to the collision case 3.

FIG. 8A is a diagram to explain a specific method of calculating a secondary lateral control time in the case of the collision case 1 to the collision case 3. FIG. 8B is a diagram to explain a specific method of calculating a secondary lateral control time in the case of the collision case 1 to the collision case 3.

When the case corresponds to any one of the collision case 1 to the collision case 3, the secondary lateral control time is the same as the primary lateral control time. The lateral control distance (Lateral Warning Distance) determined using Equation 3 is not reduced. The lateral distance between the first, second, and third lines and the target (current position) in FIG. 8B is equal to the lateral distance between the first, second, and third lines and the target (current position) in FIG. 8A.

Figure 8C:
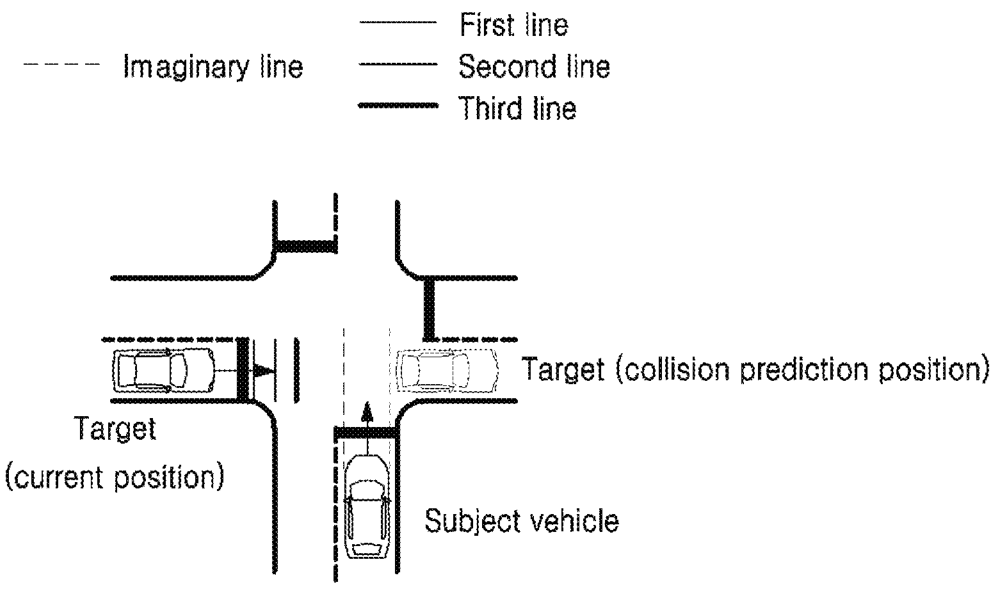
FIG. 8C is a diagram to explain a specific method of calculating a secondary lateral control time in the case of the collision case 4.
Figure 8D:
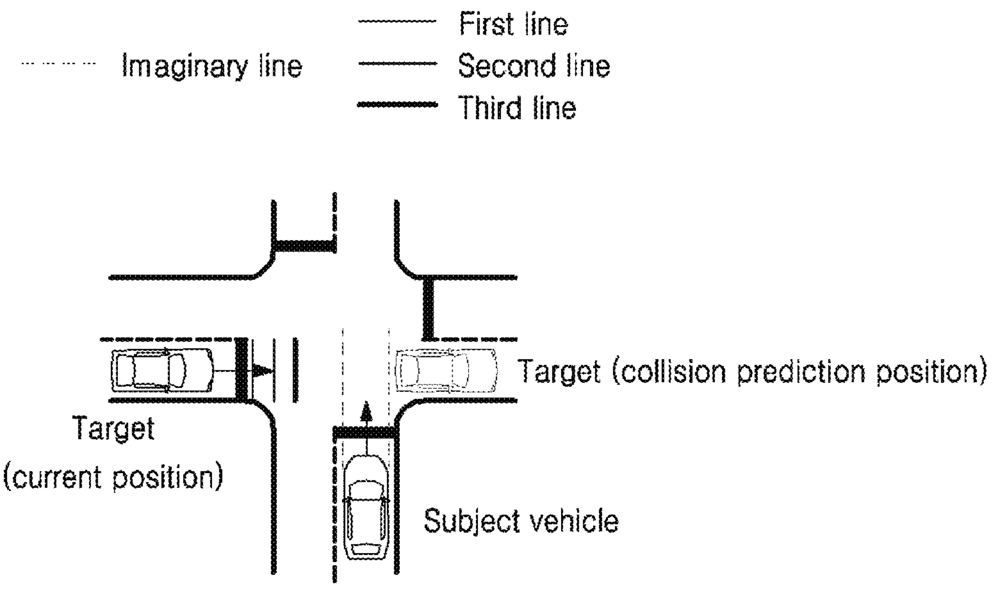
FIG. 8D is a diagram to explain a specific method of calculating a secondary lateral control time in the case of the collision case 4.

FIG. 8C is a diagram to explain a specific method of calculating a secondary lateral control time in the case of the collision case 4. FIG. 8D is a diagram to explain a specific method of calculating a secondary lateral control time in the case of the collision case 4.

When the case corresponds to the collision case 4, the secondary lateral control time is the same as the primary lateral control time. The lateral control distance (Lateral Warning Distance) determined using Equation 3 is not reduced. The lateral distance between the first, second, and third lines and the target (current position) in FIG. 8D is equal to the lateral distance between the first, second, and third lines and the target (current position) in FIG. 8C.

Figure 8E:
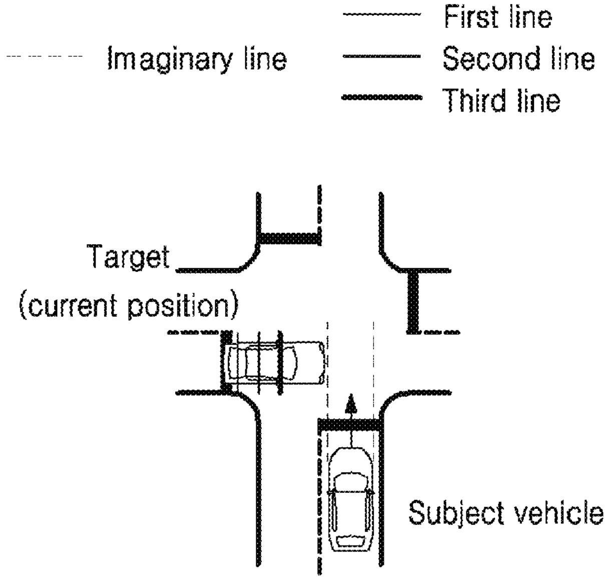
FIG. 8E is a diagram to explain a specific method of calculating a secondary lateral control time in the case of a collision case 5.
Figure 8F:
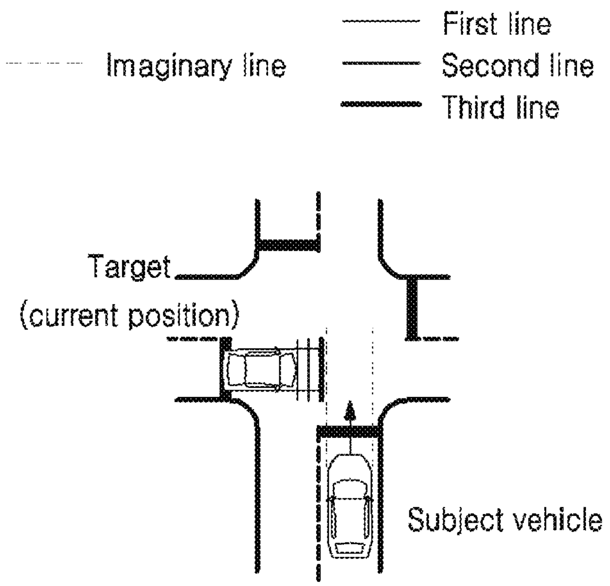
FIG. 8F is a diagram to explain a specific method of calculating a secondary lateral control time in the case of the collision case 5.

FIG. 8E is a diagram to explain a specific method of calculating a secondary lateral control time in the case of collision case 5. FIG. 8F is a diagram to explain a specific method of calculating a secondary lateral control time in the case of the collision case 5.

When the case corresponds to the collision case 5, the secondary lateral control time is delayed from the primary lateral control time. The lateral control distance (Lateral Warning Distance) determined using Equation 3 is reduced according to the deceleration of the target. The lateral distance between the first, second, and third lines and the target (current position) in FIG. 8F is shorter than the lateral distance between the first, second, and third lines and the target (current position) in FIG. 8E. Since the target is already decelerating, the stopping distance required for the target to avoid collision between the target and the subject vehicle is reduced.

Figure 8G:
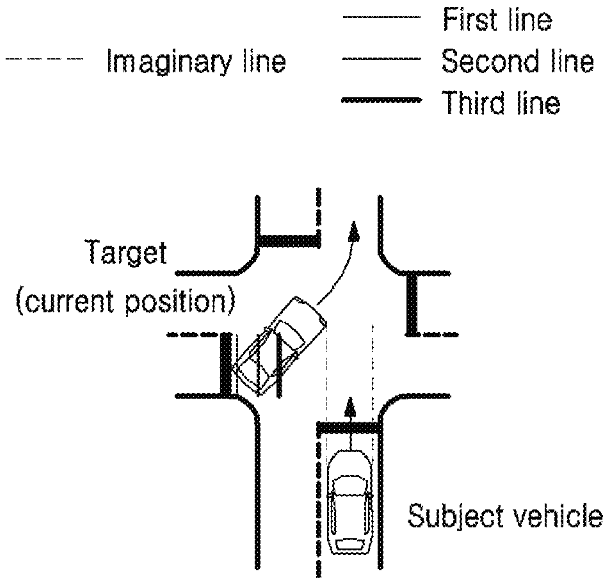
FIG. 8G is a diagram to explain a specific method of calculating a secondary lateral control time in the case of the collision case 6.
Figure 8H:
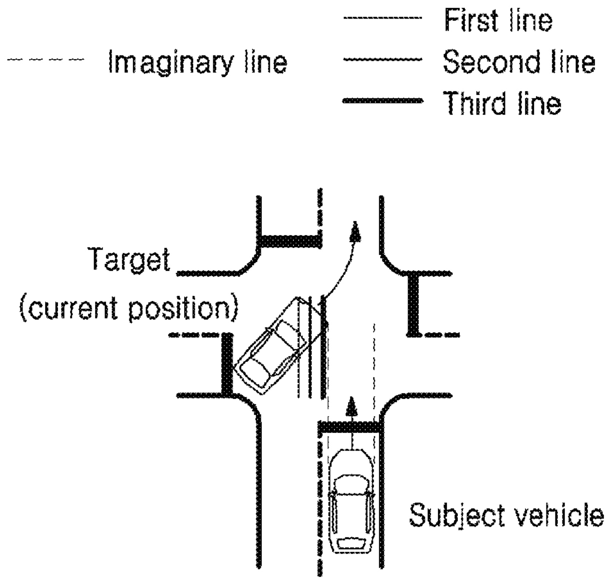
FIG. 8H is a diagram to explain a specific method of calculating a secondary lateral control time in the case of the collision case 6.

FIG. 8G is a diagram to explain a specific method of calculating a secondary lateral control time in the case of the collision case 6. FIG. 8H is a diagram to explain a specific method of calculating a secondary lateral control time in the case of the collision case 6.

When the case corresponds to the collision case 6, the secondary lateral control time is delayed from the primary lateral control time. The lateral control distance (Lateral Warning Distance) determined using Equation 3 is reduced according to the degree of steering of the target. The lateral distance between the first, second, and third lines and the target (current position) in FIG. 8H is shorter than the lateral distance between the first, second, and third lines and the target (current position) in FIG. 8G. Since the target is already steering, the steering distance required for the target to avoid the collision between the target and the subject vehicle is reduced. As an indicator for measuring the degree of steering of the target, there may be a change in the heading angle of the target.

Figure 9A:
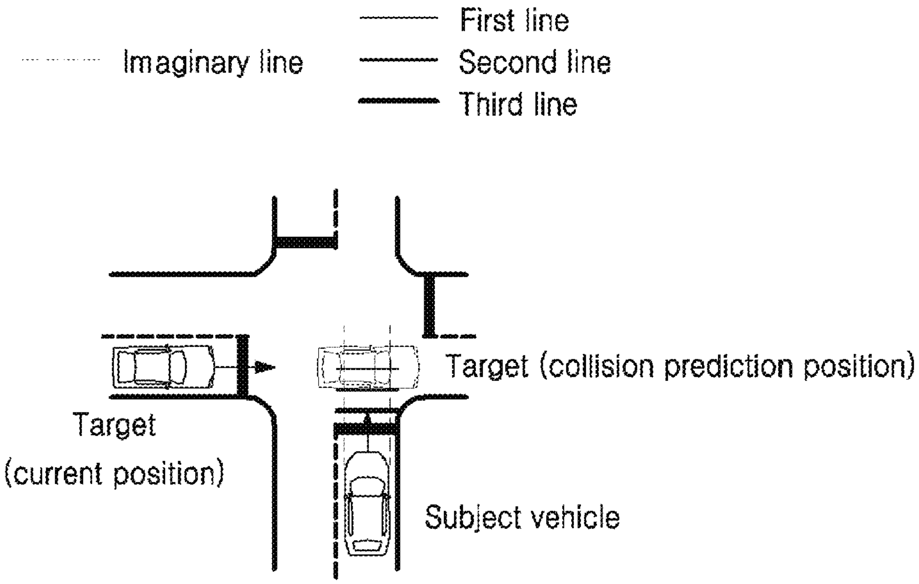
FIG. 9A is a diagram for explaining a specific method of calculating the secondary longitudinal control time in the case of the collision case 1 to the collision case 3.
Figure 9B:
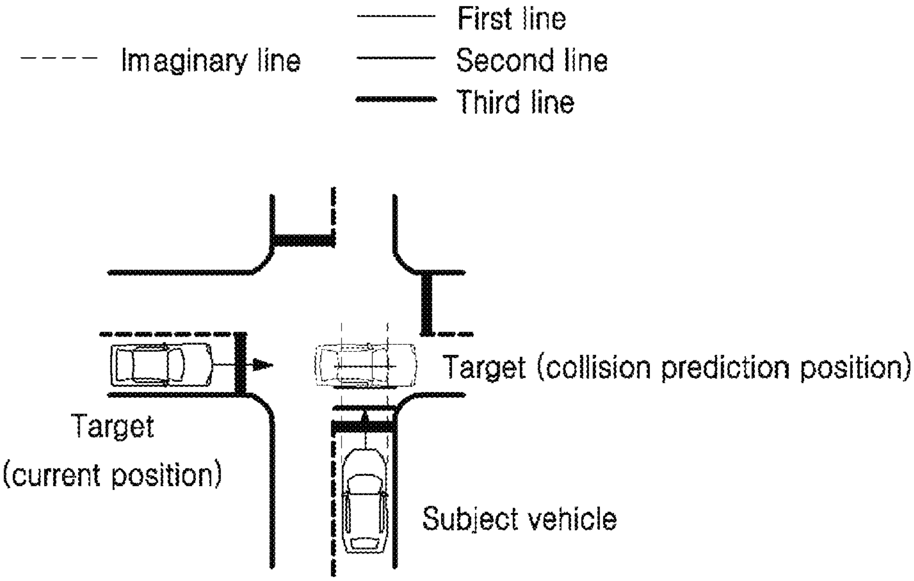
FIG. 9B is a diagram for explaining a specific method of calculating the secondary longitudinal control time in the case of the collision case 1 to the collision case 3.

FIG. 9A is a diagram for explaining a specific method of calculating the secondary longitudinal control time in the case of the collision case 1 to the collision case 3. FIG. 9B is a diagram for explaining a specific method of calculating the secondary longitudinal control time in the case of the collision case 1 to the collision case 3.

When the case corresponds to any one of the collision case 1 to the collision case 3, the secondary longitudinal control time is the same as the primary longitudinal control time. The longitudinal control distance (Longitudinal Warning Distance) determined using Equation 6 is not reduced. The longitudinal distance between the first, second, and third lines and the subject vehicle in FIG. 9B is equal to the longitudinal distance between the first, second, and third lines and the subject vehicle in FIG. 9A.

Figure 9C:
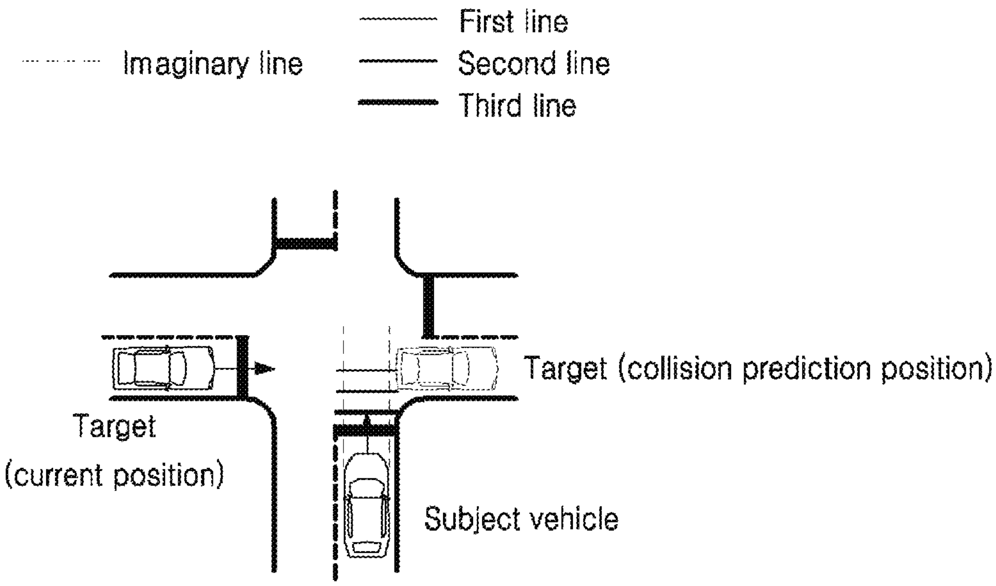
FIG. 9C is a diagram for explaining a specific method of calculating the secondary longitudinal control time in the case of the collision case 4.
Figure 9D:
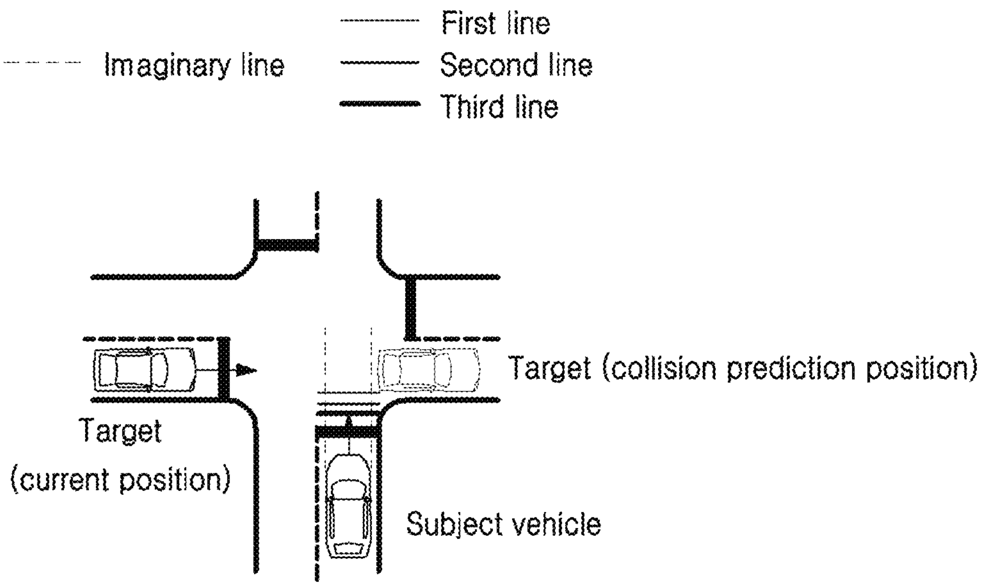
FIG. 9D is a diagram for explaining a specific method of calculating the secondary longitudinal control time in the case of the collision case 4.

FIG. 9C is a diagram for explaining a specific method of calculating the secondary longitudinal control time in the case of the collision case 4. FIG. 9D is a diagram for explaining a specific method of calculating the secondary longitudinal control time in the case of the collision case 4.

When the case corresponds to the collision case 4, the secondary longitudinal control time is delayed from the primary longitudinal control time. The longitudinal control distance (Longitudinal Warning Distance) determined using Equation 6 is reduced according to the speed at which the target escapes. The longitudinal distance between the first, second, and third lines and the subject vehicle in FIG. 9D is shorter than the longitudinal distance between the first, second, and third lines and the subject vehicle in FIG. 9C. Since the target already has sufficient speed in the lateral direction, the distance required for the subject vehicle to steer to avoid collision between the target and the subject vehicle is reduced.

Figure 9E:
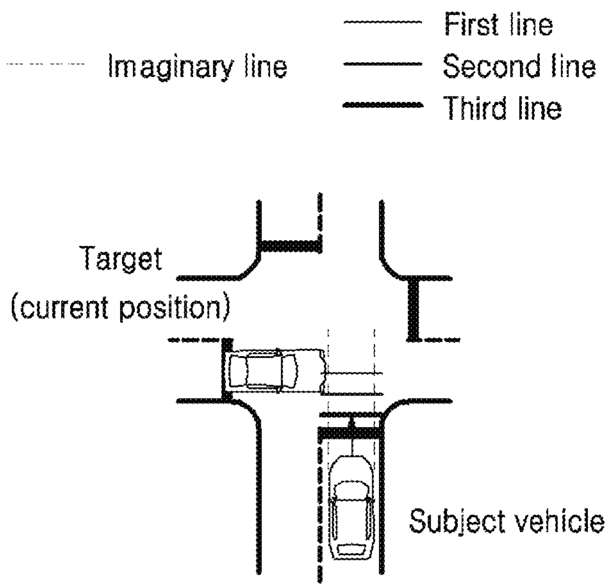
FIG. 9E is a diagram for explaining a specific method of calculating the secondary longitudinal control time in the case of the collision case 5.
Figure 9F:
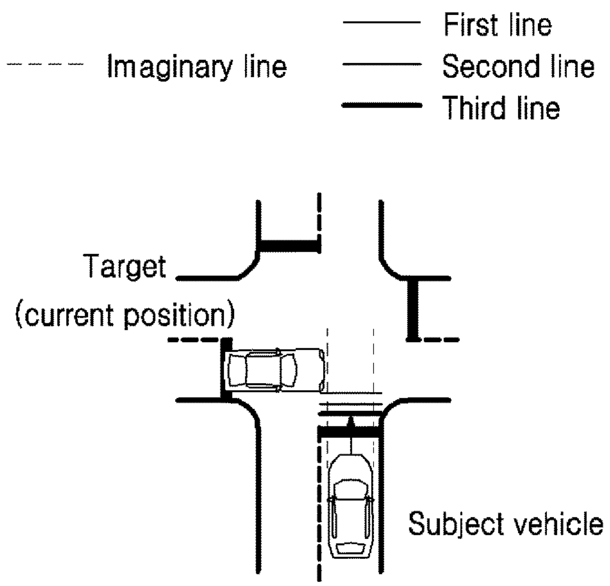
FIG. 9F is a diagram for explaining a specific method of calculating the secondary longitudinal control time in the case of the collision case 5.

FIG. 9E is a diagram for explaining a specific method of calculating the secondary longitudinal control time in the case of the collision case 5. FIG. 9F is a diagram for explaining a specific method of calculating the secondary longitudinal control time in the case of the collision case 5.

When the case corresponds to the collision case 5, the secondary longitudinal control time is delayed from the primary longitudinal control time. The longitudinal control distance (Longitudinal Warning Distance) determined using Equation 6 is reduced according to the deceleration of the target. The longitudinal distance between the first, second, and third lines and the subject vehicle in FIG. 9F is shorter than the longitudinal distance between the first, second, and third lines and the subject vehicle in FIG. 9E. Since the target is already decelerating, the distance required for the subject vehicle to steer to avoid collision between the target and the subject vehicle is reduced.

Figure 9G:
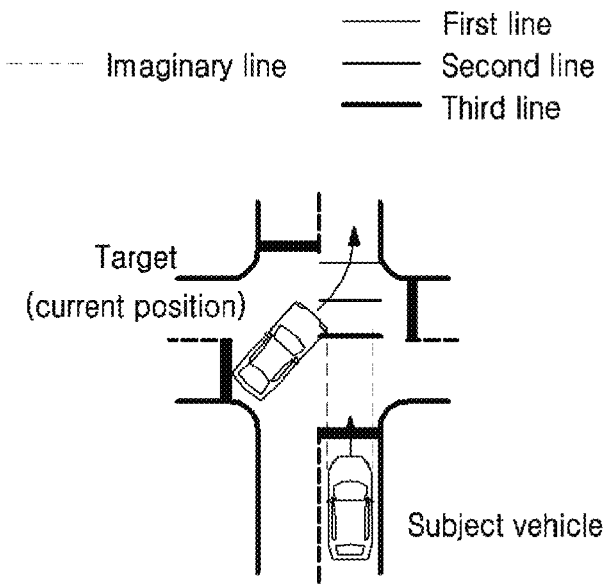
FIG. 9G is a diagram for explaining a specific method of calculating the secondary longitudinal control time in the case of the collision case 6.
Figure 9H:
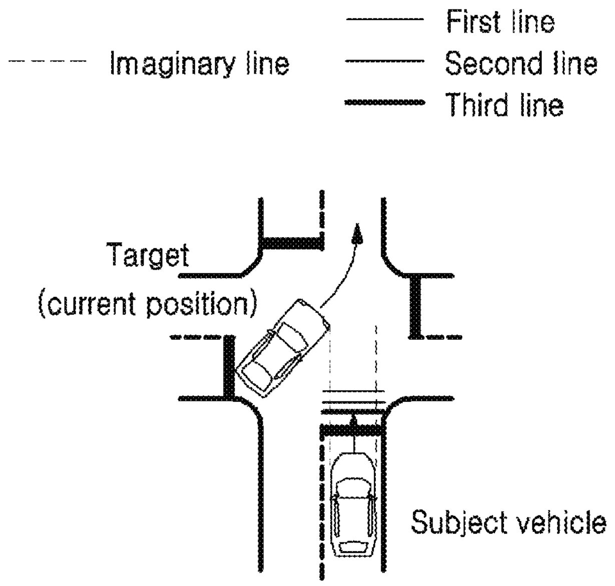
FIG. 9H is a diagram for explaining a specific method of calculating the secondary longitudinal control time in the case of the collision case 6.

FIG. 9G is a diagram for explaining a specific method of calculating the secondary longitudinal control time in the case of the collision case 6. FIG. 9H is a diagram for explaining a specific method of calculating the secondary longitudinal control time in the case of the collision case 6.

When the case corresponds to the collision case 6, the secondary longitudinal control time is delayed from the primary longitudinal control time. The longitudinal control distance (Longitudinal Warning Distance) determined using Equation 6 is reduced depending on the degree of steering of the target. The longitudinal distance between the first, second, and third lines and the subject vehicle in FIG. 9H is shorter than the longitudinal distance between the first, second, and third lines and the subject vehicle in FIG. 9G.

Since the target is already steering, the distance required for the subject vehicle to steer to avoid collision between the target and the subject vehicle is reduced. When the subject vehicle is also being steered, the longitudinal control distance (Longitudinal Warning Distance) can be reduced by considering the degree of steering of the subject vehicle. A change in the heading angle can be an indicator for measuring the degree of steering of the target and subject vehicle.

Figure 10A:
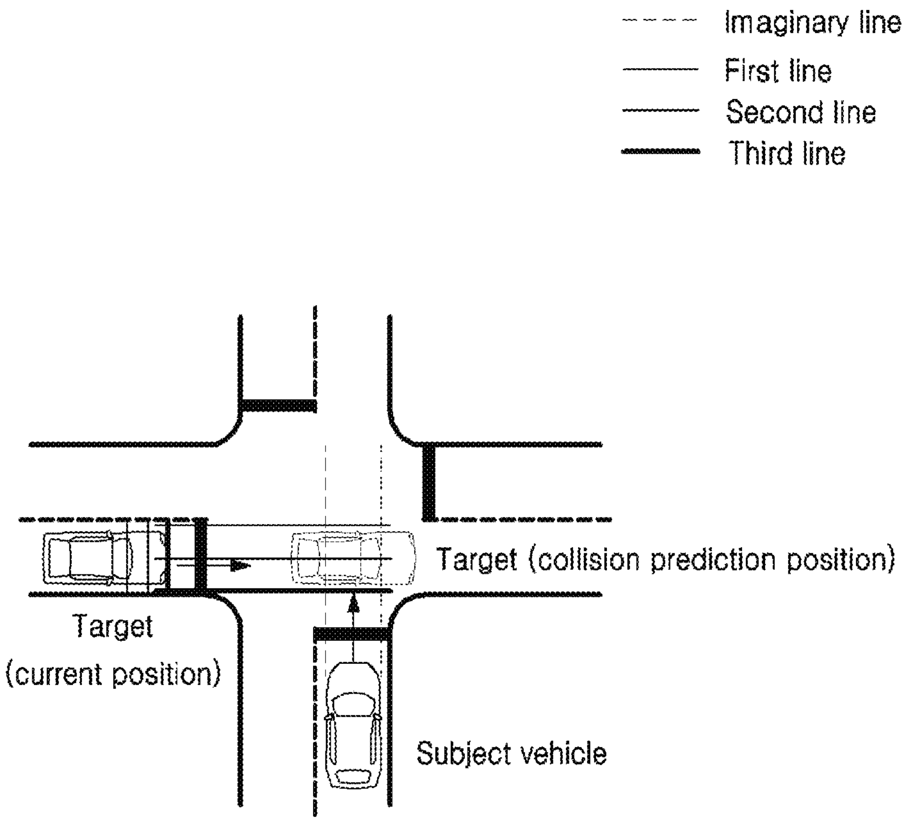
FIG. 10A is a diagram illustrating a method of applying the method and apparatus for controlling vehicle according to one embodiment of the present disclosure to the collision case 2.
Figure 10B:
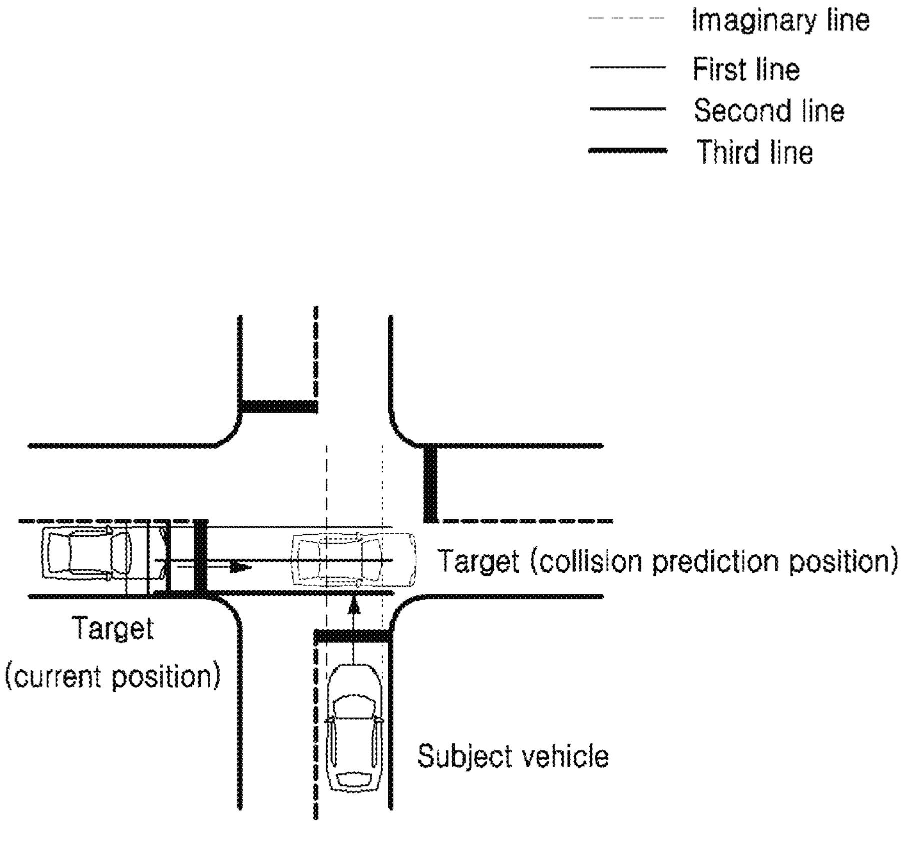
FIG. 10B is a diagram illustrating a method of applying the method and apparatus for controlling vehicle according to one embodiment of the present disclosure to the collision case 2.

FIG. 10A is a diagram illustrating a method of applying the method and apparatus for controlling vehicle according to one embodiment of the present disclosure to the collision case 2. FIG. 10B is a diagram illustrating a method of applying the method and apparatus for controlling vehicle according to one embodiment of the present disclosure to the collision case 2.

First, the control unit 105 determines the primary lateral control time and primary longitudinal control time. The calculation result is as illustrated in FIG. 10A.

Second, the control unit 105 determines the collision overlap as 100% and determines that the collision case is 2.

Third, the control unit 105 determines the secondary lateral control time and secondary longitudinal control time. The calculation result is as illustrated in FIG. 10B.

Fourth, the control unit 105 determines whether the lateral control time standard and longitudinal control time standard are satisfied.

The standard for the lateral control time is the secondary lateral control time, that is, the first, second, and third lines illustrated in front of the target in FIG. 10B. The standard for the longitudinal control time is the secondary longitudinal control time, that is, the first, second, and third lines displayed in front of the subject vehicle in FIG. 10B. In other words, when a specific portion of the target reaches the first, second, and third lines of FIG. 10B derived from the calculation of the secondary lateral control time and the secondary longitudinal control time, it is determined that the lateral control time standard and the longitudinal control time standard are satisfied. The specific portion of the target that is the standard for determination, is the front boundary (e.g., the front edge) of the target in the case of the lateral control time, and is the nearest point between the target and the subject vehicle (e.g., a point, on the target, that is nearest to the subject vehicle) in the case of the longitudinal control time. When the target is a vehicle, the lateral control time is determined based on the front bumper of the target vehicle, and the longitudinal control time is determined based on the nearest point between the target vehicle and the subject vehicle.

Regarding the lateral control time, the target front boundary passes the second line based on the current position of the target, but does not pass the third line. The lateral control time standard is satisfied by the primary braking command. Regarding the longitudinal control time, based on the current position of the target, the closest point between the target and the subject vehicle passes the second line, but does pass the third line. The longitudinal control time standard is satisfied by the primary braking command. Both the lateral control time standard and the longitudinal control time standard are satisfied. The control unit 105 transmits the primary braking command.

Figure 11A:
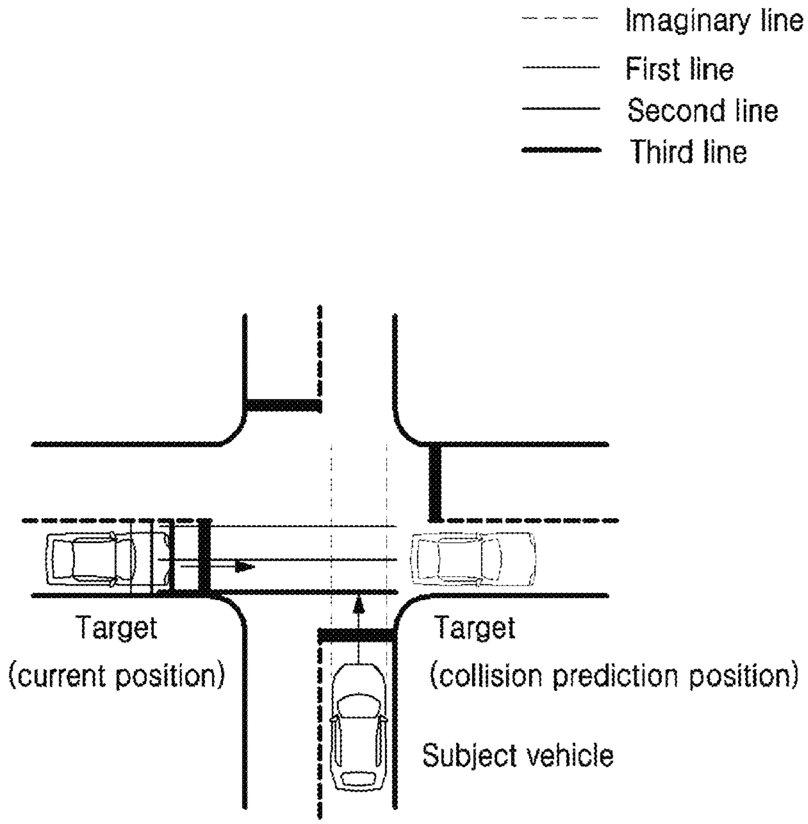
FIG. 11A is a diagram illustrating a method of applying the method and apparatus for controlling vehicle according to one embodiment of the present disclosure to the collision case 4.
Figure 11B:
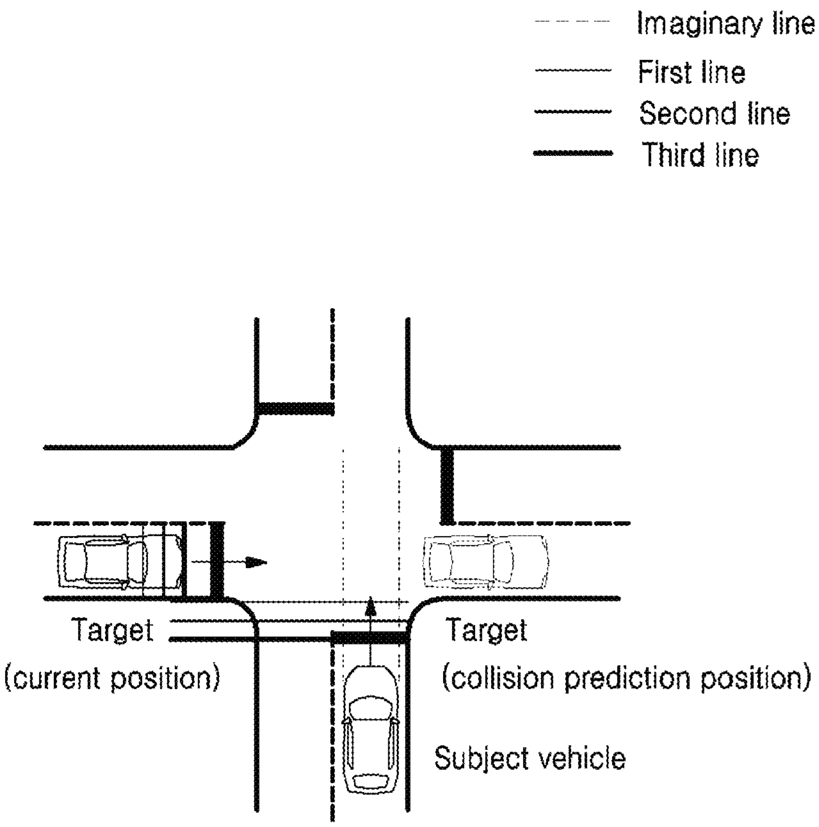
FIG. 11B is a diagram illustrating a method of applying the method and apparatus for controlling vehicle according to one embodiment of the present disclosure to the collision case 4.

FIG. 11A is a diagram illustrating a method of applying the method and apparatus for controlling vehicle according to one embodiment of the present disclosure to the collision case 4. FIG. 11B is a diagram illustrating a method of applying the method and apparatus for controlling vehicle according to one embodiment of the present disclosure to the collision case 4.

First, the control unit 105 determines the primary lateral control time and primary longitudinal control time. The calculation result is as illustrated in FIG. 11(A).

Second, the control unit 105 determines the collision overlap as 10% and determines that the collision case is 4.

Third, the control unit 105 determines the secondary lateral control time and secondary longitudinal control time. The calculation result is as illustrated in FIG. 11(B).

Fourth, the control unit 105 determines whether the lateral control time standard and longitudinal control time standard are satisfied. The basic determination method is the same as that in FIG. 10A and FIG. 10B.

Regarding the lateral control time, the target front boundary passes the second line based on the current position of the target, but does not pass the third line. The lateral control time standard is satisfied by the primary braking command. Regarding the longitudinal control time, based on the current position of the target, the closest point between the target and the subject vehicle does not pass through the first line. The longitudinal control time standard is not satisfied. The lateral control time standard is satisfied, but the longitudinal control time standard is not satisfied. The control unit 105 does not transmit (e.g., withhold or suspend) any of the warning signals and braking commands.

Figure 12A:
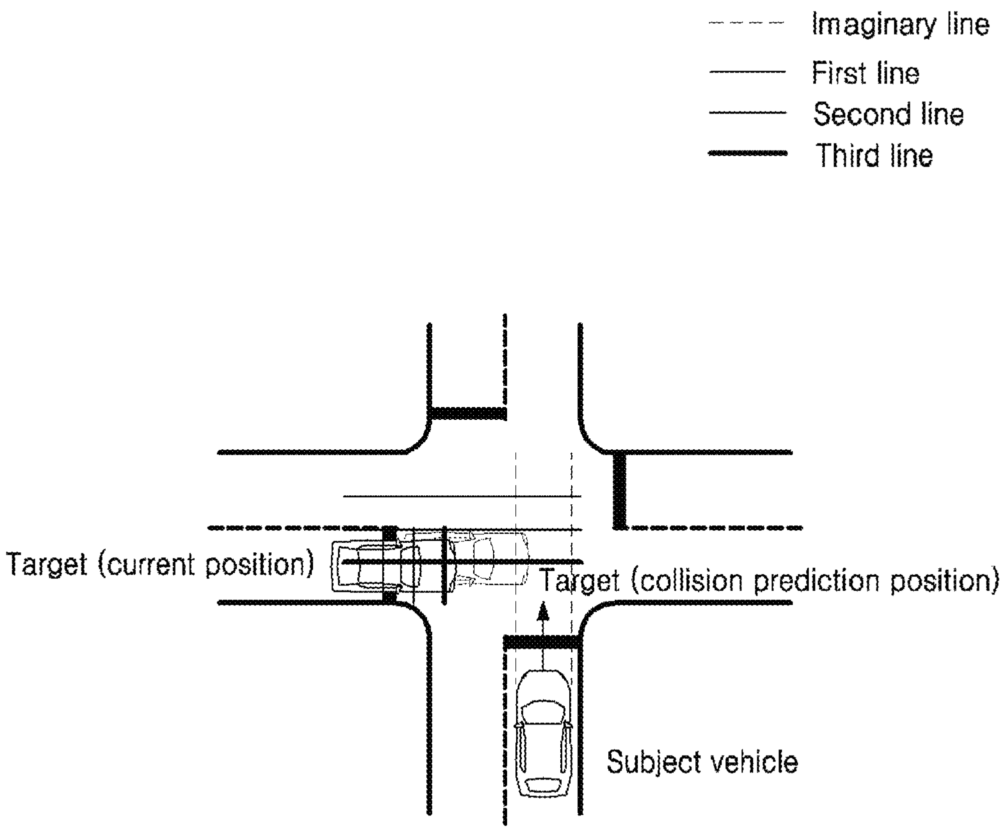
FIG. 12A is a diagram illustrating a method of applying the method and apparatus for controlling vehicle according to one embodiment of the present disclosure to the collision case 5.
Figure 12B:
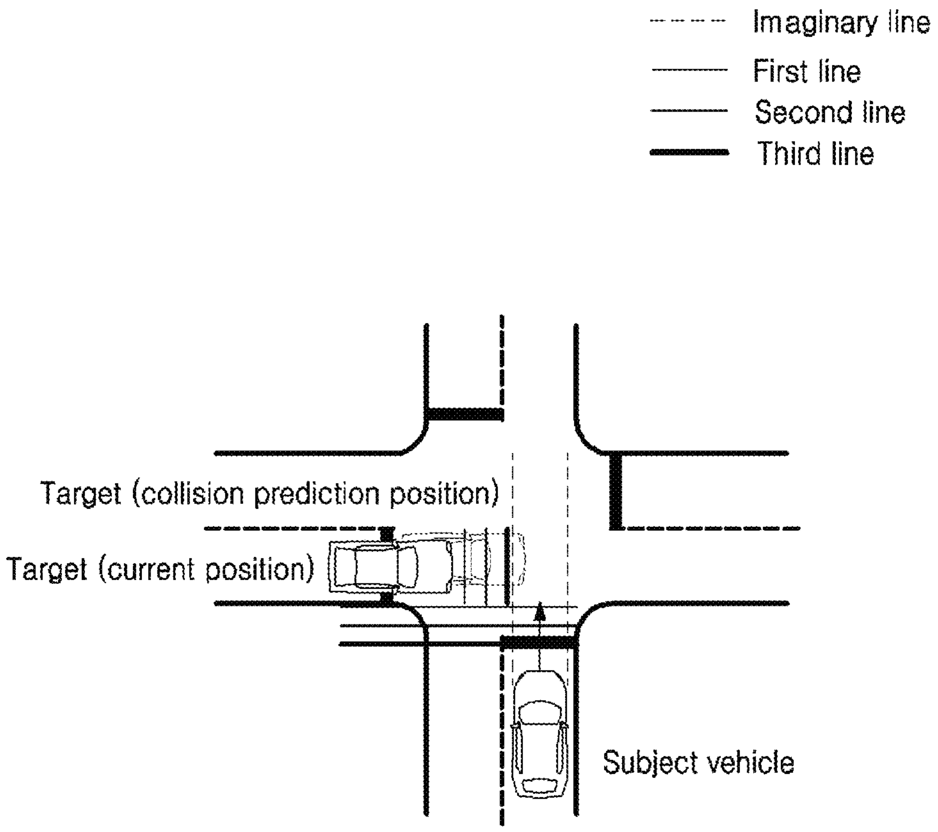
FIG. 12B is a diagram illustrating a method of applying the method and apparatus for controlling vehicle according to one embodiment of the present disclosure to the collision case 5.

FIG. 12A is a diagram illustrating a method of applying the method and apparatus for controlling vehicle according to one embodiment of the present disclosure to the collision case 5. FIG. 12B is a diagram illustrating a method of applying the method and apparatus for controlling vehicle according to one embodiment of the present disclosure to the collision case 5.

First, the control unit 105 determines the primary lateral control time and primary longitudinal control time. The calculation result is as illustrated in FIG. 12A.

Second, the control unit 105 determines the collision overlap as 20% and determines that the collision case is 5.

Third, the control unit 105 determines the secondary lateral control time and secondary longitudinal control time. The calculation result is as illustrated in FIG. 12B.

Fourth, the control unit 105 determines whether the lateral control time standard and longitudinal control time standard are satisfied. The basic determination method is the same as that in FIG. 10A and FIG. 10B.

Regarding the lateral control time, the target front boundary does not pass through the first line based on the current position of the target. The lateral control time standard is not satisfied. Regarding the final control time, based on the current position of the target, the closest point between the target and the subject vehicle does not pass through the first line. The longitudinal control time standard is not satisfied. Both the lateral control time standard and the longitudinal control time standard are not satisfied. The control unit 105 does not transmit any of the warning signals and the braking commands.

Figure 13A:
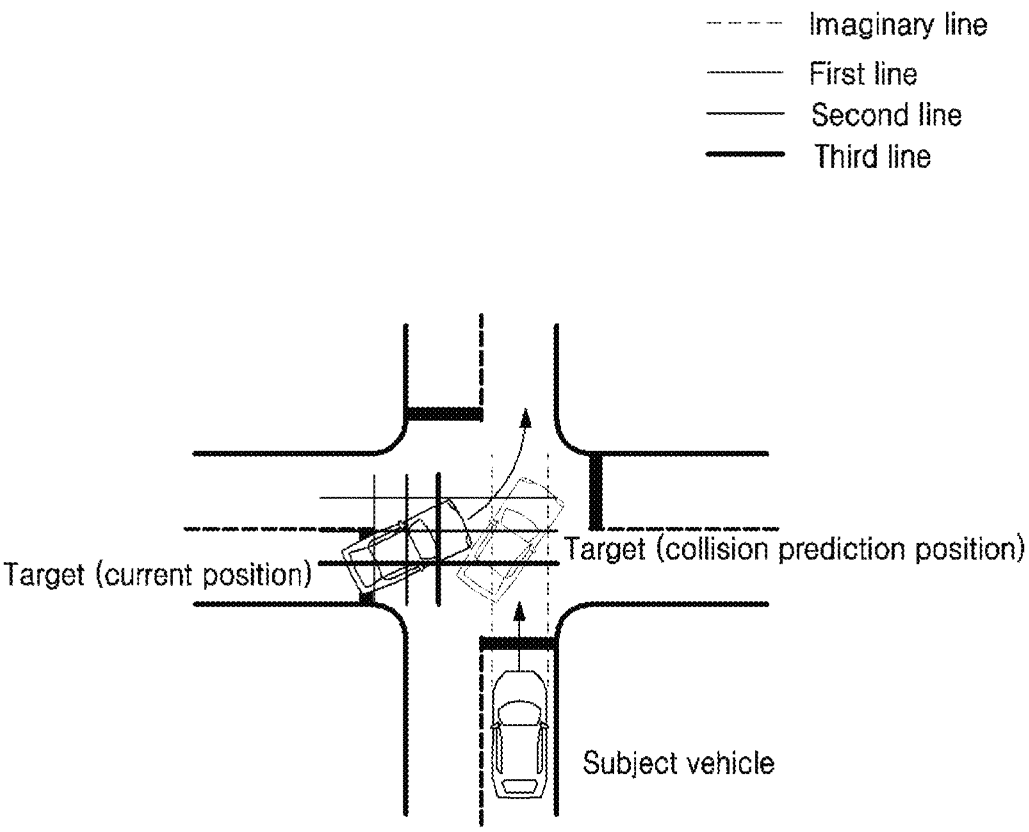
FIG. 13A is a diagram illustrating a method of applying the method and apparatus for controlling vehicle according to one embodiment of the present disclosure to the collision case 6.
Figure 13B:
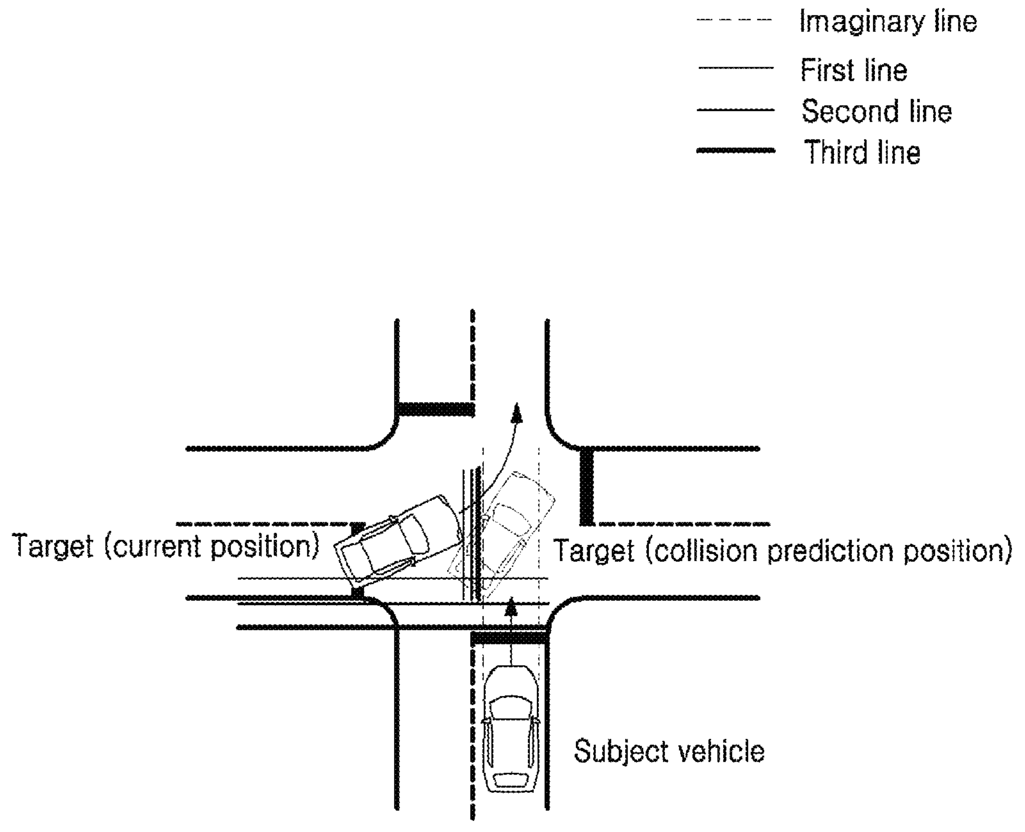
FIG. 13B is a diagram illustrating a method of applying the method and apparatus for controlling vehicle according to one embodiment of the present disclosure to the collision case 6.

FIG. 13A is a diagram illustrating a method of applying the method and apparatus for controlling vehicle according to one embodiment of the present disclosure to the collision case 6. FIG. 13B is a diagram illustrating a method of applying the method and apparatus for controlling vehicle according to one embodiment of the present disclosure to the collision case 6.

First, the control unit 105 determines the primary lateral control time and primary longitudinal control time. The calculation result is as illustrated in FIG. 13A.

Second, the control unit 105 determines the collision overlap as 100% and determines that the collision case is 6.

Third, the control unit 105 determines the secondary lateral control time and secondary longitudinal control time. The calculation result is as illustrated in FIG. 13B.

Fourth, the control unit 105 determines whether the lateral control time standard and longitudinal control time standard are satisfied. The basic determination method is the same as that in FIG. 10A and FIG. 10B.

Regarding the lateral control time, the target front boundary does not pass through the first line based on the current position of the target. The lateral control time standard is not satisfied. Regarding the longitudinal control time, based on the current position of the target, the closest point between the target and the subject vehicle passes the first line, but does not pass the second line. The longitudinal control time standard is satisfied by a warning signal. The longitudinal control time standard is satisfied, but the lateral control time standard is not satisfied. The control unit 105 does not transmit any of the warning signals and braking commands.

Figure 14:
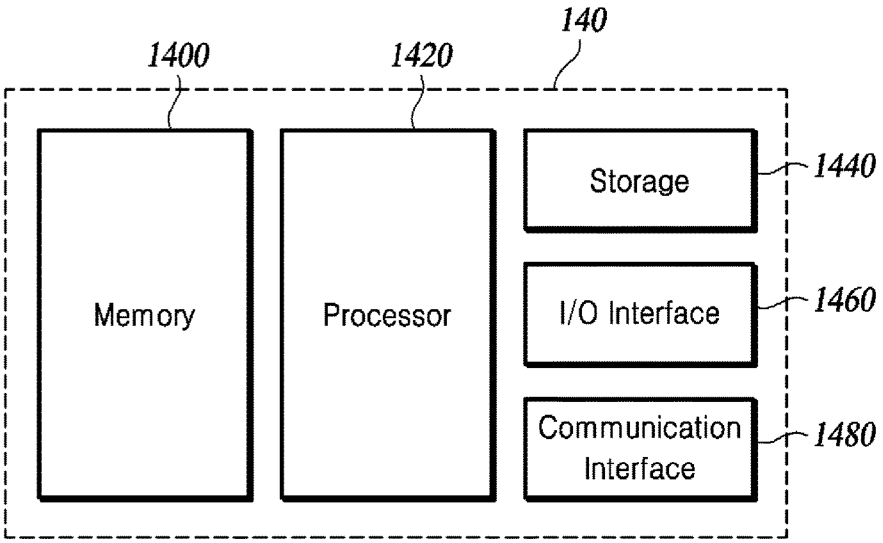
FIG. 14 is a block diagram schematically illustrating an example computing device that can be used to implement the method or device according to embodiments of the present disclosure.

FIG. 14 is a block diagram schematically illustrating an example computing device that can be used to implement the method or device according to embodiments of the present disclosure.

A computing device 140 may include some or all of a memory 1400, a processor 1420, a storage 1440, an input and output (I/O) interface 1460, and a communication interface 1480. The computing device 140 may be a stationary computing device such as a desktop computer, a server, or an AI accelerator, or a mobile computing device such as a laptop computer or a smart phone.

The memory 1400 may store a program that allows the processor 1420 to perform methods or operations according to various embodiments of the present disclosure. For example, the program may include a plurality of instructions that are executable by the processor 1420. The method illustrated in FIG. 2 may thus be performed by the plurality of instructions being executed by the processor 1420.

The memory 1400 may be a single memory or a plurality of memories. In this case, information required to perform methods or operations according to various embodiments of the present disclosure may be stored in the single memory or divided and stored in the plurality of memories. When the memory 1400 is configured of the plurality of memories, the plurality of memories may be physically separated.

The memory 1400 may include at least one of a volatile memory and a non-volatile memory. The volatile memory includes a static random-access memory (SRAM), a dynamic random-access memory (DRAM), or the like, and the non-volatile memory includes a flash memory.

The processor 1420 may include at least one core capable of executing at least one instruction. The processor 1420 may execute instructions stored in the memory 1400. The processor 1420 may be a single processor or a plurality of processors.

The storage 1440 maintains stored data even when power supplied to the computing device 140 is cut off. For example, the storage 1440 may include a non-volatile memory or may include a storage medium such as a magnetic tape, optical disc, or magnetic disk.

A program stored in the storage 1440 may be loaded into the memory 1400 before being executed by the processor 1420. The storage 1440 may store files created in a program language, and a program created from a file by a compiler or the like may be loaded into the memory 1400. The storage 1440 may store data to be processed by the processor 1420 and/or data processed by the processor 1420.

The I/O interface 1460 may provide an interface with an input device such as a keyboard or mouse, and/or an output device such as a display device or printer. A user can trigger execution of a program in the processor 1420 through the input device and/or check a processing result of the processor 1420 through the output device.

The communication interface 1480 may provide access to an external network. For example, the computing device 140 may communicate with another device via the communication interface 1480.

At least some of the components described in the exemplary embodiments of the present disclosure may be implemented by a hardware element including at least one of a digital signal processor (DSP), a processor, a controller, an application-specific IC (ASIC), a programmable logic device (FPGA, or the like), and other electronic devices, or a combination thereof. Additionally, at least some of the functions or processes described in the exemplary embodiments may be implemented as software, and the software may be stored in a recording medium. At least some of the components, functions, and processes described in exemplary embodiments of the present disclosure may be implemented through a combination of hardware and software.

Methods according to exemplary embodiments of the disclosure may be written as programs executable on a computer and may also be implemented on various recording mediums, such as magnetic storage medium, optical readout medium, digital storage medium.

Implementations of the various techniques described herein may be implemented as digital electronic circuitry, or as computer hardware, firmware, software, or combinations thereof. Implementations may be implemented as computer program products, i.e., computer programs tangibly embodied in an information carrier, e.g., a machine-readable storage device (computer-readable medium) or a radio signal, for processing by a data processing device, e.g., a programmable processor, a computer, or the operation of a plurality of computers, or for controlling the operation of a plurality of computers.

An embodiment of the present disclosure provides a vehicle control method performed in a system for preventing collision, the vehicle control method comprising: recognizing a target approaching in a lateral direction of a vehicle; calculating a primary lateral control time point based on a current position of the target; calculating collision overlap and determining a collision case based on the primary lateral control time point; calculating a secondary lateral control time point based on the collision case; and adjusting a traveling speed of the vehicle based on the secondary lateral control time point.

Another embodiment of the present disclosure provides a vehicle control device comprising: a detection sensor; a control unit; and a speed control unit, wherein the control unit recognizes a target approaching in a lateral direction of a vehicle; calculates a primary lateral control time point based on a current position of the target; calculates collision overlap and determining a collision case based on the primary lateral control time point; calculates a secondary lateral control time point based on the collision case; and adjusts a traveling speed of the vehicle based on the secondary lateral control time point.

According to one embodiment of the present disclosure, a control time point based on the lateral physical value is additionally calculated and used as a criterion for determining whether control is performed and a type of the control. It has the effect of improving the accuracy of collision avoidance.

According to one embodiment of the present disclosure, collision cases are divided into six types and control time points are calculated for each situation, thereby preventing mis-control and increasing the accuracy of collision prevention.

According to one embodiment of the present disclosure, the accuracy of collision prevention is improved by determining whether to perform control and the type of control by considering not only the current position of the target but also the predicted future collision position.

According to one embodiment of the present disclosure, in a case where a certain standard is satisfied, the case is determined as a case where a collision case 4 (Clear Path Case) in which the target and the subject vehicle do not collide and the subject vehicle passes behind the target, and the longitudinal control time point is delayed. Therefore, it is possible to prevent mis-control caused by an error of a sensor and increase accuracy of collision avoidance.

According to one embodiment of the present disclosure, in a case where a certain standard is satisfied, the case is determined as a collision case 5 (Sudden Stop Case) in which the target stops before the subject vehicle enters a path, and the lateral control time point and longitudinal control time point are delayed. Therefore, it is possible to prevent sensitive control and mis-control caused by an error of a sensor and increase accuracy of collision avoidance.

According to one embodiment of the present disclosure, in a case where a certain standard is satisfied, the case is determined as a collision case 6 (Merge Case) in which the target merges into the path of the subject vehicle, and the lateral control time point and the longitudinal control time point are delayed. Therefore, it is possible to prevent sensitive control and mis-control caused by an error of a sensor and increase accuracy of collision avoidance.

The advantageous effects of the present disclosure are not limited to those described above; other advantageous effects of the present disclosure not mentioned above may be understood clearly by those skilled in the art from the descriptions given below.

Although this specification includes details of a number of specific implementations, they should not be understood as limiting any invention or the scope of what may be claimed, but rather as a description of features that may be peculiar to a particular embodiment of the invention. Certain features described herein in the context of individual embodiments may be implemented in combination in a single embodiment. Conversely, various features described in the context of a single embodiment may also be implemented individually or in any suitable sub-combination in a plurality of embodiments. Further, while features may operate in a particular combination and may be initially described as claimed as such, one or more features of a claimed combination may be excluded from that combination in some instances, and the claimed combination may be changed to a sub-combination or variation of a sub-combination.

The embodiments of the invention disclosed herein and in the drawings are shown by way of illustration only and are not intended to limit the scope of the invention. That other modifications based on the technical ideas of the present invention may be practiced in addition to the embodiments disclosed herein will be apparent to one of ordinary skill in the art to which the present invention belongs.

The scope of protection of the embodiments herein shall be construed in accordance with the claims below, and all technical ideas within the scope thereof shall be construed to be included within the scope of the claims herein.

What is claimed is:

1. A vehicle control method performed by an apparatus of a vehicle, the vehicle control method comprising:

identifying a target approaching in a lateral direction of the vehicle;

determining, based on a current position of the target, a primary lateral control time;

determining, based on the primary lateral control time, a collision overlap, wherein the collision overlap indicates what proportion of a lateral width of the vehicle is projected to overlap with a longitudinal width of the target;

determining, based on the collision overlap, a secondary lateral control time by modifying the primary lateral control time; and adjusting, based on the secondary lateral control time, a traveling speed of the vehicle.

2. The vehicle control method of claim 1, further comprising:

determining, based on the current position of the target, a primary longitudinal control time;

determining, based on the collision overlap, a secondary longitudinal control time; and adjusting, based on the secondary longitudinal control time, the traveling speed of the vehicle.

3. The vehicle control method of claim 2, wherein the adjusting of the traveling speed of the vehicle comprises:

determining, based on the secondary lateral control time and the secondary longitudinal control time, whether a lateral control time threshold and a longitudinal control time threshold are satisfied; and suspending, based on at least one of the lateral control time threshold or the longitudinal control time threshold not being satisfied, transmitting at least one of a warning signal and a braking command.

4. The vehicle control method of claim 2, wherein the adjusting of the traveling speed of the vehicle comprises:

determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a warning signal.

5. The vehicle control method of claim 4, wherein the determining of whether the lateral control time threshold and the longitudinal control time threshold are satisfied comprises at least one of:

determining that the lateral control time threshold is satisfied based on the current position of the target indicating that a front edge of the target has passed through a reference line; or determining that the longitudinal control time threshold is satisfied based on the current position of the target indicating that a nearest point, on the target, to the vehicle has passed through the reference line.

6. The vehicle control method of claim 2, wherein the adjusting of the traveling speed of the vehicle comprises:

determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a primary braking command.

7. The vehicle control method of claim 6, wherein the determining of whether the lateral control time threshold and the longitudinal control time threshold are satisfied comprises at least one of:

determining that the lateral control time threshold is satisfied based on the current position of the target indicating that a front edge of the target has passed through a reference line; or determining that the longitudinal control time threshold is satisfied based on the current position of the target indicating that a nearest point, on the target, to the vehicle has passed through the reference line.

8. The vehicle control method of claim 2, wherein the adjusting of the traveling speed of the vehicle comprises:

determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a secondary braking command.

9. The vehicle control method of claim 8, wherein the determining of whether the lateral control time threshold and the longitudinal control time threshold are satisfied comprises at least one of:

determining that the lateral control time threshold is satisfied based on the current position of the target indicating that a front edge of the target has passed through a reference line; or determining that the longitudinal control time threshold is satisfied based on the current position of the target indicating that a nearest point, on the target, to the vehicle has passed through the reference line.

10. A vehicle control device comprising:

a sensor;

a controller; and a speed controller, wherein the controller is configured to:

identify, via the sensor, a target approaching in a lateral direction of a vehicle;

determine, based on a current position of the target, a primary lateral control time;

determine, based on the primary lateral control time, a collision overlap, wherein the collision overlap indicates what proportion of a lateral width of the vehicle is projected to overlap with a longitudinal width of the target;

determine, based on the collision overlap, a secondary lateral control time by modifying the primary lateral control time; and adjust, via the speed controller and based on the secondary lateral control time, a traveling speed of the vehicle.

11. The vehicle control device of claim 10, wherein the controller is further configured to:

determine, based on the current position of the target, a primary longitudinal control time;

determine, based on the collision overlap, a secondary longitudinal control time; and adjust, via the speed controller and based on the secondary longitudinal control time, the traveling speed of the vehicle.

12. The vehicle control device of claim 11, wherein the controller is configured to adjust the traveling speed of the vehicle by:

determining, based on the secondary lateral control time and the secondary longitudinal control time, whether a lateral control time threshold and a longitudinal control time threshold are satisfied; and suspending, based on at least one of the lateral control time threshold or the longitudinal control time threshold not being satisfied, transmitting at least one of a warning signal and a braking command.

13. The vehicle control device of claim 11, wherein the controller is configured to adjust the traveling speed of the vehicle by:

determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a warning signal.

14. The vehicle control device of claim 13, wherein the controller is configured to determine whether the lateral control time threshold and the longitudinal control time threshold are satisfied by at least one of:

determining that the lateral control time threshold is satisfied based on the current position of the target indicating that a front edge of the target has passed through a reference line; or determining that the longitudinal control time threshold is satisfied based on the current position of the target indicating that a nearest point, on the target, to the vehicle has passed through the reference line.

15. The vehicle control device of claim 11, wherein the controller is configured to adjust the traveling speed of the vehicle by:

determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a primary braking command.

16. The vehicle control device of claim 15, wherein the controller is configured to determining of whether the lateral control time threshold and the longitudinal control time threshold are satisfied by at least one of:

determining that the lateral control time threshold is satisfied based on the current position of the target indicating that a front edge of the target has passed through a reference line; and determining that the longitudinal control time threshold is satisfied based on the current position of the target indicating that a nearest point, on the target, to the vehicle has passed through the reference line.

17. The vehicle control device of claim 11, wherein the controller is configured to adjust the traveling speed of the vehicle by:

determining, based on the secondary lateral control time and the secondary longitudinal control time, whether a lateral control time threshold and a longitudinal control time threshold are satisfied; and transmitting, based on at least one of the lateral control time threshold or the longitudinal control time threshold being satisfied, a secondary braking command.

18. The vehicle control device of claim 17, wherein the controller is configured to determine whether the lateral control time threshold and the longitudinal control time threshold are satisfied by at least one of:

determining that the lateral control time threshold is satisfied based on the current position of the target indicating that a front edge of the target has passed through a reference line; and determining that the longitudinal control time threshold is satisfied based on the current position of the target indicating that a nearest point, on the target, to the vehicle has passed through the reference line.

19. A vehicle comprising:

a sensor;

a processor; and a memory storing at least one instruction configured to be executed by the processor to cause the vehicle to:

identify, via the sensor, a target approaching in a lateral direction of the vehicle;

determine, based on a current position of the target, a primary lateral control time;

determine, based on the primary lateral control time, a collision overlap, wherein the collision overlap indicates what proportion of a lateral width of the vehicle is projected to overlap with a longitudinal width of the target;

determine, based on the primary lateral control time and based on the collision overlap, a secondary lateral control time; and adjust, based on the secondary lateral control time, a traveling speed of the vehicle.

20. The vehicle of claim 19, wherein the secondary lateral control time is determined by, based on the collision overlap, selectively modifying or maintaining the primary lateral control time.

* * * * *